(12) United States Patent
Yoshida

(10) Patent No.: US 12,222,578 B2
(45) Date of Patent: Feb. 11, 2025

(54) LIGHT EMITTING MODULE

(71) Applicant: NICHIA CORPORATION, Anan (JP)

(72) Inventor: Norimasa Yoshida, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/470,379

(22) Filed: Sep. 19, 2023

(65) Prior Publication Data

US 2024/0103248 A1 Mar. 28, 2024

(30) Foreign Application Priority Data

Sep. 27, 2022 (JP) ................... 2022-154098

(51) Int. Cl.
| | |
|---|---|
| G02B 7/02 | (2021.01) |
| F21V 14/00 | (2018.01) |
| F21V 14/06 | (2006.01) |
| F21Y 115/10 | (2016.01) |
| G02B 3/08 | (2006.01) |
| G02B 3/14 | (2006.01) |

(52) U.S. Cl.
CPC ............ *G02B 7/023* (2013.01); *F21V 14/006* (2013.01); *F21V 14/06* (2013.01); *G02B 3/08* (2013.01); *G02B 3/14* (2013.01); *F21Y 2115/10* (2016.08); *G02B 2207/113* (2013.01)

(58) Field of Classification Search
CPC ................................. G02B 3/14; F21V 14/06
See application file for complete search history.

(56) References Cited

U.S. PATENT DOCUMENTS

| | | | | |
|---|---|---|---|---|
| 2,920,184 | A * | 1/1960 | Kessler | E01F 9/547 |
| | | | | 47/33 |
| 10,449,896 | B1 * | 10/2019 | Vemulapati | F21V 5/04 |
| 10,559,630 | B2 | 2/2020 | Schubert et al. | |
| 10,616,562 | B2 | 4/2020 | Schubert et al. | |
| 2002/0149864 | A1 | 10/2002 | Kaneko | |
| 2010/0118414 | A1 * | 5/2010 | Bolis | G02B 3/14 |
| | | | | 359/666 |
| 2010/0232161 | A1 * | 9/2010 | Aschwanden | H04N 23/55 |
| | | | | 359/666 |
| 2011/0128739 | A1 * | 6/2011 | Hikmet | F21L 4/005 |
| | | | | 362/277 |
| 2013/0168716 | A1 | 7/2013 | Lin et al. | |
| 2013/0170220 | A1 * | 7/2013 | Bueeler | F21K 9/69 |
| | | | | 362/296.01 |
| 2017/0160442 | A1 | 6/2017 | Phair et al. | |

(Continued)

FOREIGN PATENT DOCUMENTS

| | | | | |
|---|---|---|---|---|
| EP | 3002510 A1 * | 4/2016 | ......... | G02B 26/0875 |
| EP | 3002548 B1 | 9/2016 | | |

(Continued)

*Primary Examiner* — Alexander K Garlen
(74) *Attorney, Agent, or Firm* — Global IP Counselors, LLP

(57) ABSTRACT

A light emitting module includes a light source, a first lens configured to transmit light from the light source and including at least a portion that is elastically deformable, and an actuator configured to move the first lens in a direction along an optical axis of the first lens. The light source includes a contact portion with which the first lens comes into contact. The actuator is configured to move the first lens to change a state of the first lens relative to the contact portion of the light source.

11 Claims, 27 Drawing Sheets

(56) References Cited

U.S. PATENT DOCUMENTS

2019/0302324 A1 10/2019 Tsai et al.
2019/0339509 A1 11/2019 Chuang et al.

FOREIGN PATENT DOCUMENTS

| JP | 2000-081504 | A | 3/2000 | |
|----|----|----|----|----|
| JP | 2002-311213 | A | 10/2002 | |
| JP | 2006-258986 | A | 9/2006 | |
| JP | 2011-112757 | A | 6/2011 | |
| JP | 2013-140976 | A | 7/2013 | |
| JP | 2017-521718 | A | 8/2017 | |
| JP | 2019-184997 | A | 10/2019 | |
| JP | 2019-194694 | A | 11/2019 | |
| WO | 2017/091921 | A1 | 6/2017 | |
| WO | WO-2022138211 | A1 * | 6/2022 | ............ F21V 14/02 |

* cited by examiner

LIGHT EMITTING MODULE

CROSS-REFERENCE TO RELATED APPLICATIONS

This application is based on and claims priority to Japanese Patent Application No. 2022-154098, filed on Sep. 27, 2022, the entire contents of which are incorporated herein by reference.

TECHNICAL FIELD

The disclosure herein relates to a light emitting module.

BACKGROUND

Light emitting modules including light emitting diodes and the like have been widely used. For example, Japanese Laid-open Patent Publication No. 2002-311213 describes a configuration in which a light-transmissive elastic member has a first surface and a second surface opposite the first surface, and the first surface has a higher elasticity than that of the second surface. With this configuration, upon a pressure being applied to the second surface of the elastic member, the second surface of the elastic member is selectively deformed, and a focus distance is varied.

SUMMARY

The thickness of a light emitting module is required to be reduced.

A light emitting module according to an embodiment of the present disclosure includes a light source; a first lens configured to transmit light from the light source and including at least a portion that is elastically deformable; and an actuator configured to move the first lens in a direction along an optical axis of the first lens. The light source includes a contact portion with which the first lens comes into contact. The actuator is configured to move the first lens to change a state of the first lens relative to the contact portion of the light source.

According to an embodiment of the present disclosure, it is desirable to provide a light emitting module having a reduced thickness.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
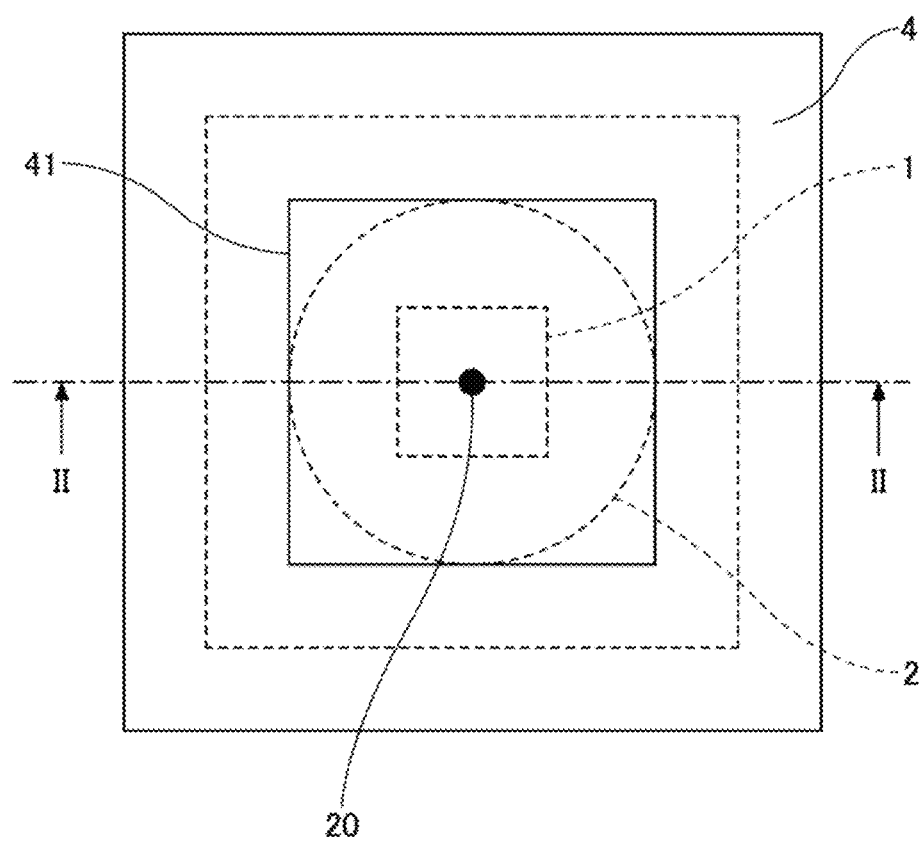
FIG. 1 is a top view schematically illustrating an example configuration of a light emitting module according to a first embodiment.

Light emitting modules according to embodiments of the present disclosure will be described in detail with reference to the accompanying drawings. The embodiments described below exemplify the light emitting module to embody the technical idea of the embodiments, and are not limited to the following description. In addition, unless otherwise specified, the dimensions, materials, shapes, relative arrangements, and the like of components described in the embodiments are not intended to limit the scope of the present disclosure thereto, but are described as examples. The sizes, positional relationships, and the like of members illustrated in the drawings may be exaggerated for clearer illustration. Furthermore, in order to avoid excessive complication of the drawings, a schematic view in which some elements are not illustrated may be used, or an end view illustrating only a cut surface may be used as a cross-sectional view. In the following description, the same names and reference numerals refer to the same or equivalent members, and a detailed description thereof will be omitted as appropriate. An end view illustrating only a cut surface may be used as a cross-sectional view.

In the drawings, directions may be indicated by an X-axis, a Y-axis, and a Z-axis, and the X-axis, the Y-axis, and the Z-axis are orthogonal to one another. An X direction along the X-axis and a Y direction along the Y-axis indicate directions along a light emitting surface of a light source included in the light emitting module according to the embodiment. A Z direction along the Z-axis indicates a direction orthogonal to the light emitting surface. That is, the light emitting surface of the light source is parallel to the XY plane, and the Z-axis is orthogonal to the XY plane.

A direction indicated by an arrow in the X direction is referred to as a +X direction or a +X side, and a direction opposite to the +X direction is referred to as a −X direction or a −X side. A direction indicated by an arrow in the Y direction is referred to as a +Y direction or a +Y side, and a direction opposite to the +Y direction is referred to as a −Y direction or a −Y side. A direction indicated by an arrow in the Z direction is referred to as a +Z direction or a +Z side, and a direction opposite to the +Z direction is referred to as a −Z direction or a −Z side. In the embodiment, it is assumed that the light source included in the light emitting module emits light to the +Z side as an example. Further, the term "top view" as used in the embodiment refers to viewing an object from the +Z direction. However, these directions do not limit the orientation of the light emitting module during use, and the orientation of the light emitting module is arbitrary. In addition, in the present embodiment, a surface of the object when viewed from the +Z direction or the +Z side is referred to as an "upper surface", and a surface of the object when viewed from the −Z direction or the −Z side is referred to as a "lower surface". In the embodiment described below, each of the phrases "along the X-axis", "along the Y-axis", and "along the Z-axis" includes a case where the object has an inclination in a range of ±10° with respect to the corresponding one of the axes. Further, in the present embodiment, the term "orthogonal" may include an error within ±10° with respect to 90°.

First Embodiment

Light Emitting Module 100

Figure 2:
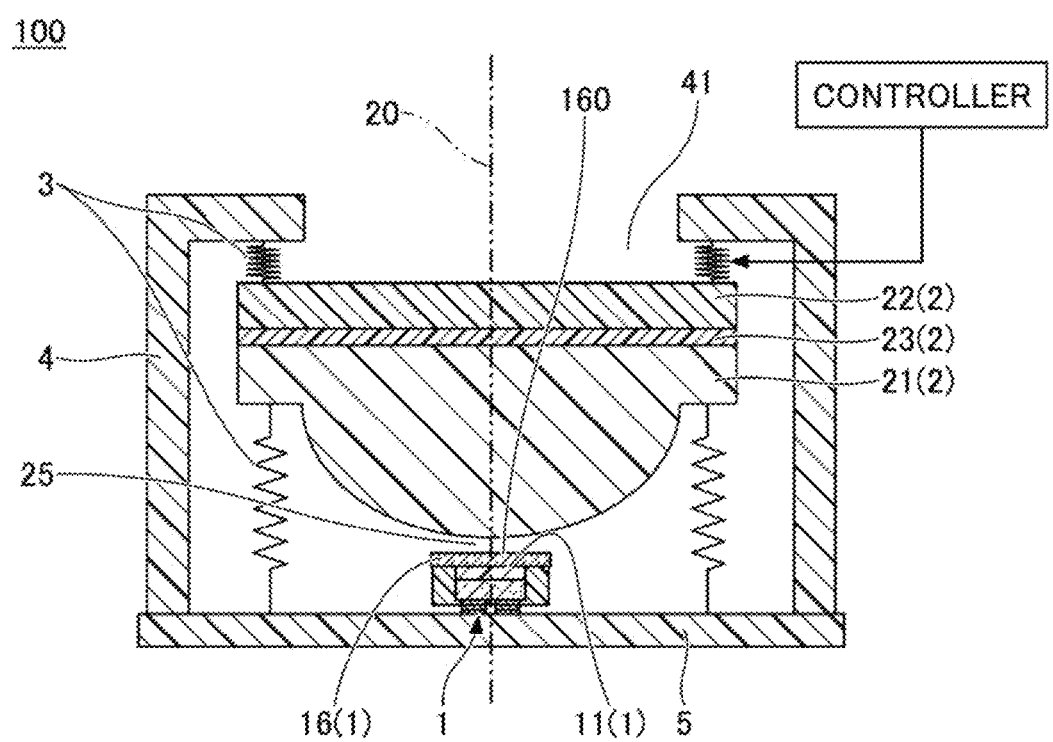
FIG. 2 is a cross-sectional view of the light emitting module taken through II-II of FIG. 1.

A configuration of a light emitting module 100 according to a first embodiment will be described with reference to FIG. 1 and FIG. 2. FIG. 1 is a top view schematically illustrating an example of the light emitting module 100. FIG. 2 is a cross-sectional view of the light emitting module 100 taken through II-II of FIG. 1.

As illustrated in FIG. 1, the outer shape of the light emitting module 100 in a top view is a substantially rectangular shape. As illustrated in FIG. 1 and FIG. 2, the light emitting module 100 includes a light source 1, a first lens 2, and an actuator 3. The light source 1, the first lens 2, and the actuator 3 are housed within a housing 4.

The light source 1 is mounted on the upper surface (on the +Z side) of a mounting substrate 5. The mounting substrate 5 is a plate-shaped member having a substantially rectangular outer shape in a top view. The mounting substrate 5 is a substrate having wiring, and a light emitting element and various electric elements can be mounted on the mounting substrate 5.

The light source 1 emits light upward (to the +Z side). In the embodiment, the light source 1 includes an optical member 16. The optical member 16 is disposed between a light emitting surface 11 of the light source 1 and the first lens 2. The optical member 16 transmits light from the light emitting surface 11. The optical member 16 preferably has a transmittance of 60% or more with respect to light from the light emitting surface 11. The optical member 16 is preferably composed of glass. The optical member 16 may include glass, resin, and the like. In the preset embodiment, the optical member 16 includes a contact portion 160 with which the first lens 2 comes into contact. That is, the light source 1 includes the contact portion 160 with which the first lens 2 comes into contact. The contact portion 160 is a surface of the optical member 16 that faces the first lens 2.

As used herein, the term "contact" means that objects abut and contact each other. In the present specification and the claims, the objects correspond to the light source 1 and the first lens 2. A state in which the light source 1 and the first lens 2 are in contact with each other means that the light source 1 and the first lens 2 abut and contact each other. In addition, in the present specification and the claims, the term "contact" also includes a case in which a film or the like is interposed between the objects and the objects are not directly in contact with each other. Specifically, when stress caused by deformation of the first lens 2 is applied to the light source 1, it can be said that the first lens 2 and the light source 1 are in contact with each other. That is, in the present embodiment, even when the light source 1 and the first lens 2 are in contact with each other with a film being interposed therebetween, it can be said that the light source 1 and the first lens 2 are in contact with each other.

The light source 1 does not necessarily include the optical member 16. If the light source 1 does not include the optical member 16, the light emitting surface 11 serves as a contact portion, for example. However, the light emitting surface 11 generates heat when light is emitted, and thus, it is preferable for the light source 1 to include the optical member 16 in consideration of the influence of heat on the first lens 2 that contacts the contact portion. When the light source 1 includes the optical member 16, and the optical member 16 includes the contact portion 160, heat generated from the light emitting surface 11 when the light source 1 emits light can be prevented from being transmitted directly to the first lens 2. Accordingly, deterioration of or damage to the first lens 2, which contacts the contact portion 160, due to heat can be reduced. In addition, since heat generated by the light source 1 can be dissipated through the optical member 16 and the first lens 2 that contacts the optical member 16, an improvement in heat dissipation of the entire light source 1 can be expected.

The first lens 2 is disposed above (on the +Z side) of the light source 1. The first lens 2 is supported by the housing 4 via the actuator 3. The first lens 2 is moved by the actuator 3, thereby changing the position of the first lens 2 relative to the light source 1 in the vertical direction (Z direction). The first lens 2 transmits light from the light source 1.

As illustrated in FIG. 2, the first lens 2 includes a first portion 21 and a second portion 22. The first portion 21 is a portion that comes into contact with the contact portion 160 of the light source 1. As the first lens 2 is moved by the 13 actuator 3, the position of the first lens 2 relative to the light source 1 in the vertical direction (Z direction) is changed, thereby causing the first portion 21 to contact the contact portion 160.

In the state illustrated in FIG. 2, a first air layer 25 is present between the contact portion 160 of the light source 1 and the first portion 21 of the first lens 2. That is, the first portion 21 is not in contact with the contact portion 160. The first lens 2 in the state illustrated in FIG. 2 is moved by the actuator 3 to cause the first portion 21 to contact the contact portion 160, which will be described later with reference to FIG. 8A and FIG. 8B.

The first portion 21, which is a portion of the first lens 2, is elastically deformable by contacting the contact portion 160. The hardness of the second portion 22, which is another portion of the first lens 2, may be higher than that of the first portion 21. In other words, the second portion 22 may be less elastically deformable as compared to the first portion 21. Further, the first lens 2 may include an adhesive member 23 that is disposed between the first portion 21 and the second portion 22 to bond the first portion 21 and the second portion 22.

The first portion 21 preferably has a convex surface protruding toward the light source, such that the first portion 21 is elastically deformable by contacting the contact portion 160. The convex surface may be a spherical surface or may be an aspherical surface. Of them, an aspherical surface constituted by a free-form surface is preferable in view of light controllability. In addition, the first portion 21 may partially have a flat surface or a concave surface in a region that comes into contact with the contact portion 160.

In a case where the first lens 2 includes the first portion 21 and the second portion 22, at least the second portion 22 is preferably connected to the actuator 3. Since the second portion 22 is less elastically deformable, connecting the second portion 22 to the actuator 3 allows the first lens 2 to be stably supported and to be stably moved. Although the first lens 2 may include the second portion 22, the first lens 2 does not necessarily include the second portion 22. That is, the entire first lens 2 may be configured with the first portion 21 that is elastically deformable. In other words, at least a portion of the first lens 2 may be elastically deformable. In the present embodiment, the first lens 2 includes the first portion 21 and the second portion 22, and each of the first portion 21 and the second portion 22 is connected to the actuator 3 and is supported by the housing 4 via the actuator 3.

As an example, the first portion 21 can include a silicone resin or the like. The second portion 22 can include a material having a higher hardness than that of the silicone resin. As the material having a higher hardness than that of the silicone resin, an epoxy resin, a polycarbonate resin, or the like can be used. Further, the first portion 21 and the second portion 22 may include respective silicone resins having different hardness. For example, the first portion 21 and the second portion 22 are bonded by the adhesive member 23. A light transmissive resin or the like capable of bonding the first portion 21 and the second portion 22 can be used for the adhesive member 23. The first portion 21 and the second portion 22 may be directly bonded without the adhesive member 23. The first lens 2 in which the first portion 21 and the second portion 22 are directly bonded can be formed by two-shot molding.

The actuator 3 moves the first lens 2 in a direction along the optical axis 20 of the first lens 2. In the light emitting module 100, the state of the first lens 2 relative to the contact portion 160 of the light source 1 is changed as the first lens 2 is moved by the actuator 3. Specifically, the state of the first lens 2 relative to the contact portion 160 of the light source 1 is changed between a state in which an air layer is present between the light source 1 and the first lens 2 and the first lens 2 is not elastically deformed, and a state in which the first lens 2 is in contact with the light source 1 and the first lens 2 is elastically deformed.

For example, the actuator 3 can move the first lens 2 in the direction along the optical axis of the first lens 2 in response to an operation input signal from an operation part or the like of an imaging device. Alternatively, the light emitting module 100 may include a controller configured to control the operation of the actuator 3. The actuator 3 may move the first lens 2 in the direction along the optical axis 20 of the first lens 2 in response to a control signal from the controller. The operation part or the controller may be implemented with a computer including one or a plurality of processors, a storage device, etc. The actuator 3 may be driven electromagnetically, piezoelectrically, ultrasonically, or the like.

The housing 4 is fixed to the upper surface of the mounting substrate 5 by an adhesive member or the like. The light source 1, the first lens 2, and the actuator 3 are housed within a box-shaped member constituted by the housing 4 and the mounting substrate 5. As the material of the housing 4, a resin material, a metal material, or the like can be used.

The housing 4 has an opening 41. The opening 41 has a substantially rectangular shape in a top view. However, the opening 41 may have a substantially circular shape, a substantially polygonal shape, or the like. The opening 41 is provided such that the optical axis 20 of the first lens 2 passes through the opening 41 in a top view. After light emitted from the light source 1 is transmitted through the first lens 2, the light is emitted to an irradiation region located above the light emitting module 100. In order to prevent the inside of the housing 4 from being exposed to the outside, a light transmissive plate-shaped member that transmits light from the light emitting surface 11 may be disposed in the opening 41.

Example Configuration of Light Source 1

Figure 3:
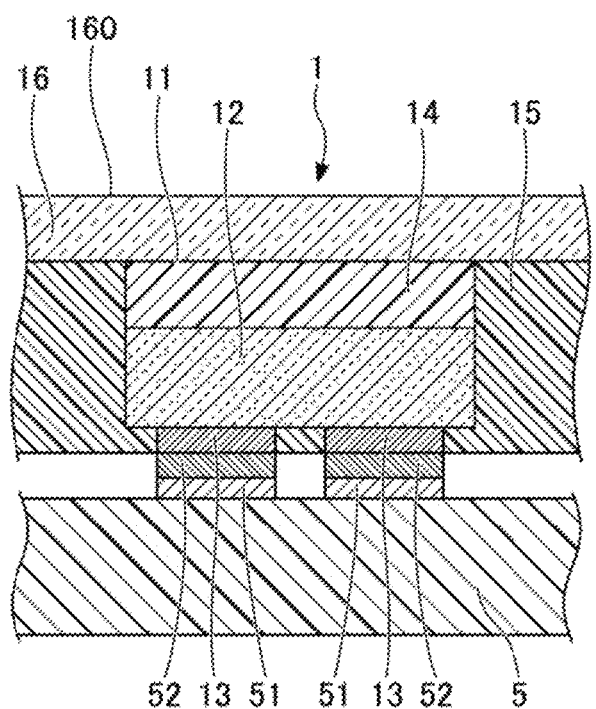
FIG. 3 is a cross-sectional view schematically illustrating an example of a light source of the light emitting module of FIG. 1.

The light source 1 includes a light emitting element 12. The light emitting element 12 is a semiconductor light emitting element such as a light emitting diode (LED) or a semiconductor laser diode (LD). As the light source 1, only the light emitting element 12 can be used. Alternatively, as the light source 1, a light emitting device that includes the light emitting element 12 and other members can be used. Further, as the light source 1, a light emitting device that includes a plurality of light emitting elements may be used. FIG. 3 is a cross-sectional view schematically illustrating an example configuration of the light source 1. FIG. 3 illustrates a cross section of the light source 1 taken through II-II of FIG. 1. In the example illustrated in FIG. 3, the light source 1 includes the light emitting element 12, a light transmissive member 14, a covering member 15, and the optical member 16. In the present embodiment, a surface on the opposite side of the light transmissive member 14 from the light emitting element 12 serves as the light emitting surface 11 of the light source 1. Further, a surface on the opposite side of the optical member 16 from the light transmissive member 14 serves as the contact portion 160, and contacts the first lens 2. If only the light emitting element is used as the light source 1, the light emitting element preferably includes positive and negative electrodes on the same surface. In this case, a surface on the opposite side of the light emitting element from the positive and negative electrodes serves as both the light emitting surface 11 of the light source 1 and the contact portion 160 of the light source 1, and contacts the first lens 2. The light source 1 emits light from the light emitting surface 11 toward the first lens 2 located on the +Z side of the light source 1. The light emitting surface 11 refers to a main light extraction surface of the light source 1. Light emitted from the light source 1 may be multi-color light such as white light and amber light, or may be single-color light such as blue light, red light, or green light. The wavelength and chromaticity of light emitted from the light source 1 may be appropriately selected according to the use of the light emitting module 100.

The light source 1 is disposed on the surface on the +Z side of the mounting substrate 5, with the surface on the +Z side of the light source 1 serving as the light emitting surface 11, and the surface opposite the light emitting surface 11 serving as a mounting surface. The light source 1 includes the light emitting element 12; the light transmissive member 14 provided on the surface on the +Z side of the light emitting element 12; the covering member 15 that covers the side surfaces of the light emitting element 12 and the side surfaces of the light transmissive member 14 except for the surface on the +Z side of the light transmissive member 14; and the optical member 16 provided on the surface on the +Z side of the light transmissive member 14.

The light emitting element 12 includes at least a semiconductor structure. The semiconductor structure includes an n-side semiconductor layer, a p-side semiconductor layer, and an active layer interposed between the n-side semiconductor layer and the p-side semiconductor layer. The active layer may be a single quantum well (SQW) structure or a multiple quantum well (MQW) structure including a plurality of well layers. The semiconductor structure includes a plurality of semiconductor layers made of nitride semiconductors. The nitride semiconductors include semiconductors of all compositions obtained by varying the composition ratio x and y within their ranges in the chemical formula $In_xAl_yGa_{1-x-y}N$ ($0 \leq x$, $0 \leq y$, $x+y \leq 1$). The peak wavelength of light from the active layer can be appropriately selected in accordance with the purpose. The active layer is configured to emit, for example, visible light or ultraviolet light.

The semiconductor structure may include a plurality of light emitting regions each including an n-side semiconductor layer, an active layer, and a p-side semiconductor layer. If the semiconductor structure includes a plurality of light emitting regions, well layers in the light emitting regions may emit light having different peak emission wavelengths or the same peak emission wavelength. The same peak emission wavelength may include a variation of about several nanometers. A combination of peak emission wavelengths of light from the plurality of light emitting regions can be appropriately selected. For example, if the semiconductor structure includes two light emitting regions, combinations of light emitted from the light emitting regions include blue light and blue light, green light and green light, red light and red light, ultraviolet light and ultraviolet light, blue light and green light, blue light and red light, green light and red light, and the like. For example, if the semiconductor structure includes three light emitting regions, combinations of light emitted from the light emitting regions include blue light, green light, and red light. Each of the light emitting regions may include one or more well layers emitting light having different peak emission wavelengths from those of other well layers.

The light emitting element 12 may include a support substrate that supports a semiconductor stack. If the light emitting element 12 includes a support substrate, at least a pair of positive and negative electrodes 13 (for example, a p-side electrode and an n-side electrode) are preferably disposed on the semiconductor stack. With this configuration, the surface of the support substrate on the side opposite to the semiconductor structure can constitute the light emitting surface 11 of the light emitting element 12. As the support substrate, an insulating substrate, such as sapphire or a spinel ($MgAl_2O_4$), or a nitride-based semiconductor substrate such as gallium nitride can be used. The support substrate can be preferably formed of a light-transmissive material in order to extract light emitted from the active layer through the support substrate.

In the present embodiment, the outer shape of the light emitting surface 11 in a top view is a substantially rectangular shape. However, the outer shape of the light emitting surface 11 in a top view may be a substantially circular shape or a substantially elliptical shape, or may be a substantially polygonal shape such as a substantially triangular shape or a substantially hexagonal shape.

The light transmissive member 14 is a member having, for example, a substantially rectangular outer shape in a top view. The light transmissive member 14 is disposed to cover the upper surface of the light emitting element 12. The light transmissive member 14 can be formed of a light transmissive resin material or an inorganic material such as ceramic or glass. Examples of the resin material include a thermosetting resin such as a silicone resin, a silicone-modified resin, an epoxy resin, an epoxy-modified resin, and a phenol resin. In particular, a silicone resin or a modified resin thereof having excellent light resistance and heat resistance is preferably used. As used herein, "light transmissive" means that 60% or more of the light from the light emitting element 12 is preferably transmitted. The light transmissive member 14 may be formed of a thermoplastic resin such as a polycarbonate resin, an acrylic resin, a methylpentene resin, or a polynorbornene resin. Further, the light transmissive member 14 may include, in any of the above-described resins, a light diffusing substance or a wavelength conversion substance that converts the wavelength of at least part of the light from the light emitting element 12. For example, the light transmissive member 14 may be a resin material, ceramic, glass, or the like containing a wavelength conversion substance, a sintered body of a wavelength conversion substance, or the like. Further, the light transmissive member 14 may be a multilayer member in which a resin layer containing a wavelength conversion substance or a light diffusing substance is disposed on the surface on the ±Z side of a molded body made of resin, ceramic, glass, or the like.

Examples of a wavelength conversion substance included in the light transmissive member 14 include yttrium aluminum garnet based phosphors (for example, $(Y,Gd)_3(Al,Ga)_5O_{12}:Ce$), lutetium aluminum garnet based phosphors (for example, $Lu_3(Al,Ga)_5O_{12}:Ce$), terbium aluminum garnet based D phosphors (for example, $Tb_3(Al,Ga)_5O_{12}:Ce$), CCA based phosphors (for example, $Ca_{10}(PO_4)_6Cl_2:Eu$), SAE based phosphors (for example, $Sr_4Al_{14}O_{25}:Eu$), chlorosilicate based phosphors (for example, $Ca_8MgSi_4O_{16}Cl_2:Eu$), silicate based phosphors (for example, $(Ba, Sr, Ca, Mg)_2SiO_4:Eu$), oxynitride based phosphors such as β-SiAlON based phosphors (for example, $(Si, Al)_3(O,N)_4:Eu$) and α-SiAlON based phosphors (for example, $Ca(Si,Al)_{12}(O,N)_{16}$:Eu), nitride based phosphors such as LSN based phosphors (for example, $(La,Y)_3Si_6N_{11}$:Ce), BSESN based phosphors (for example, $(Ba,Sr)_2Si_5N_8$:Eu), SLA based phosphors (for example, $SrLiAl_3N_4$:Eu), CASN based phosphors (for example, $CaAlSiN_3$:Eu), and SCASN based phosphors (for example, $(Sr,Ca)AlSiN_3$:Eu), fluoride based phosphors such as KSF based phosphors (for example, $K_2SiF_6$:Mn), KSAF based phosphors (for example, $K_2(Si_{1-x}Al_x)F_{6-x}$:Mn, where x satisfies $0<x<1$), and MGF based phosphors (for example, $3.5MgO \cdot 0.5MgF_2 \cdot GeO_2$:Mn), quantum dots having a Perovskite structure (for example, $(Cs,FA,MA)(Pb,Sn)(F,Cl,Br,I)_3$, where FA and MA represent formamidinium and methylammonium, respectively), II-VI quantum dots (for example, CdSe), III-V quantum dots (for example, InP), and quantum dots having a chalcopyrite structure (for example, $(Ag,Cu)(In,Ga)(S,Se)_2$). The phosphors described above are particles. One of these wavelength conversion substances may be used alone, or two or more of these wavelength conversion substances may be used in combination.

In the present embodiment, the light emitting module 100 uses a blue light emitting element as the light emitting element 12. The light transmissive member 14 includes a wavelength conversion substance that converts the wavelength of light emitted from the light emitting element 12 into the wavelength of yellow, thereby emitting white light. Examples of a light diffusing substance included in the light transmissive member 14 include titanium oxide, barium titanate, aluminum oxide, silicon oxide, and the like.

The covering member 15 is configured to cover the side surfaces of the light emitting element 12 and the light transmissive member 14. The covering member 15 is configured to directly or indirectly cover the side surfaces of the light emitting element 12 and the light transmissive member 14. The upper surface of the light transmissive member 14 is exposed from the covering member 15. The upper surface of the light transmissive member 14 is the light emitting surface 11 of the light source 1.

In the light emitting module 100, the light source 1 may have a plurality of light emitting surfaces 11. For example, the light source 1 may include a plurality of light emitting parts that include respective light emitting surfaces 11. The plurality of light emitting parts may be, for example, a plurality of light emitting elements 12, or may be a plurality of light emitting elements 12 and light transmissive members 14 that cover the plurality of respective light emitting elements 12. If the light source 1 includes a plurality of light emitting parts, the covering member 15 may be continuous or may be separated between adjacent light emitting parts among the plurality of light emitting parts. In order to improve the light extraction efficiency, the covering member 15 is preferably composed of a member having a high light reflectance. For example, a resin material containing a light reflective substance such as a white pigment can be used for the covering member 15.

Examples of the light reflective substance include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, silicon oxide, and the like. It is preferable to use one of the above substances alone or a combination of two or more of the above substances. Further, as the resin material, it is preferable to use a base material including a resin material whose main component is a thermosetting resin such as an epoxy resin, an epoxy-modified resin, a silicone resin, a silicone-modified resin, or a phenol resin. Further, instead of or in addition to the light reflective substance, the covering member 15 may include a wavelength conversion substance or a pigment for adjusting the color tone of light emitted from the light source 1. The covering member 15 may be configured with a light transmissive member that transmits visible light as necessary. Further, the covering member 15 may include a light absorbing material such as carbon black, graphite, or titanium-based black pigment.

The light source 1 is electrically connected to wiring 51 of the mounting substrate 5. The mounting substrate 5 preferably includes the wiring 51 disposed at least on the surface of the mounting substrate 5. The light source 1 and the mounting substrate 5 are electrically connected to each other by connecting the wiring 51 of the mounting substrate 5 to at least a pair of positive and negative electrodes 13 via electrically-conductive adhesive members 52. The configuration, the size, and the like of the wiring 51 of the mounting substrate 5 are set in accordance with the configuration, the size, and the like of the electrodes 13 of the light source 1. The wiring 51 of the mounting substrate 5 may be disposed inside the mounting substrate.

As a base material, the mounting substrate preferably uses an insulating material, preferably uses a material through which light emitted from the light source 1, external light, or the like is not easily transmitted, and preferably uses a material having a certain strength. Specifically, the mounting substrate 5 can include, as a base material, a ceramic such as alumina, aluminum nitride, mullite, or silicon nitride, or a resin such as a phenol resin, an epoxy resin, a polyimide resin, a bismaleimide triazine resin (BT resin), or polyphthalamide.

The wiring 51 can be composed of at least one of copper, iron, nickel, tungsten, chromium, aluminum, silver, gold, titanium, palladium, rhodium, an alloy thereof, and the like. In addition, a layer of silver, platinum, aluminum, rhodium, gold, an alloy thereof, or the like may be provided on the surface layer of the wiring 51 from the viewpoint of wettability and/or light reflectivity of the electrically-conductive adhesive members 52.

Modifications of Light Source 1

Modifications of the light source 1 will be described with reference to FIG. 4 through FIG. 7. In the above-described embodiment and the modifications thereof, the same names and reference numerals refer to the same or equivalent members, and a detailed description thereof will be omitted as appropriate. The same applies to embodiments and modifications thereof as will be described later. Further, the modifications of the light source 1 are not only modifications of the light source according to the first embodiment, but may also be modifications of light sources according to a second embodiment through a fourth embodiment, which will be described later.

(First Modification of Light Source 1)

Figure 4:
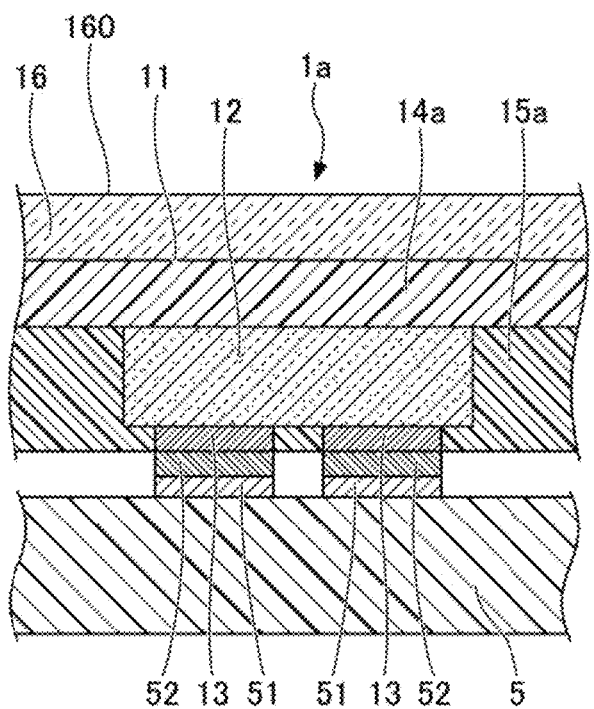
FIG. 4 is a cross-sectional view schematically illustrating a light source according to a first modification.
Figure 4:
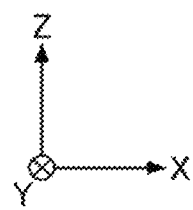

FIG. 4 is a cross-sectional view schematically illustrating an example configuration of a light source 1a according to a first modification. The light source 1a includes a light transmissive member 14a and a covering member 15a. The configuration of the light source 1a other than the light transmissive member 14a and the covering member 15a may be the same as the configuration of the light source 1. The light transmissive member 14a is provided on the surface on the +Z side of the light emitting element 12. The covering member 15a covers the side surfaces of the light emitting element 12, except for the surface on the +Z side of the light emitting element 12. The light transmissive member 14a covers the surface on the +Z side of the covering member 15a.

(Second Modification of Light Source 1)

Figure 5:
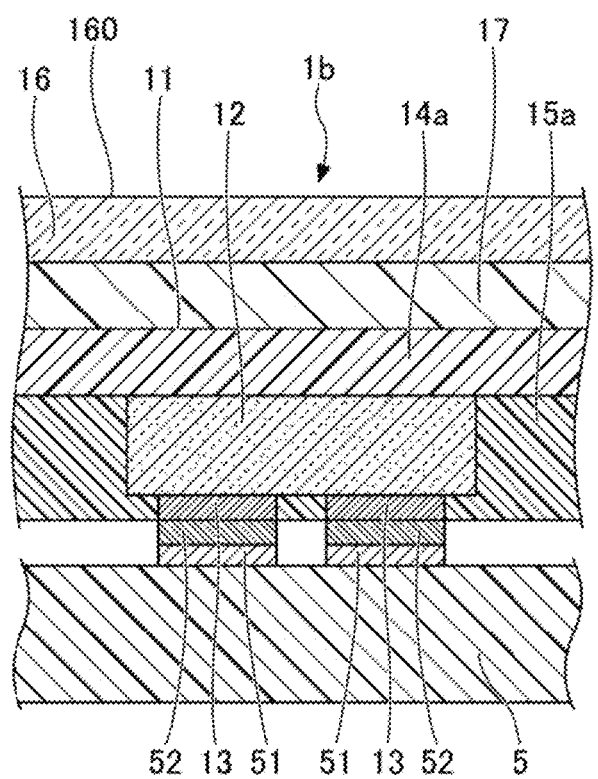
FIG. 5 is a cross-sectional view schematically illustrating a light source according to a second modification.

FIG. 5 is a cross-sectional view schematically illustrating an example configuration of a light source 1b according to a second modification. The light source 1b includes a light diffusion member 17 disposed between the light transmissive member 14a and the optical member 16. The configuration of the light source 1b other than the light diffusion member 17 may be the same as the configuration of the light source 1a. The light diffusion member 17 is provided on the surface on the +Z side of the light transmissive member 14a. The light diffusion member 17 is a plate-shaped member that includes titanium oxide, barium titanate, aluminum oxide, silicon oxide, or the like. The light diffusion member 17 diffuses light from the light transmissive member 14a. The light diffused by the light diffusion member 17 is transmitted through the optical member 16, is transmitted through the first lens 2, and is then emitted to the irradiation region.

(Third Modification of Light Source 1)

Figure 6:
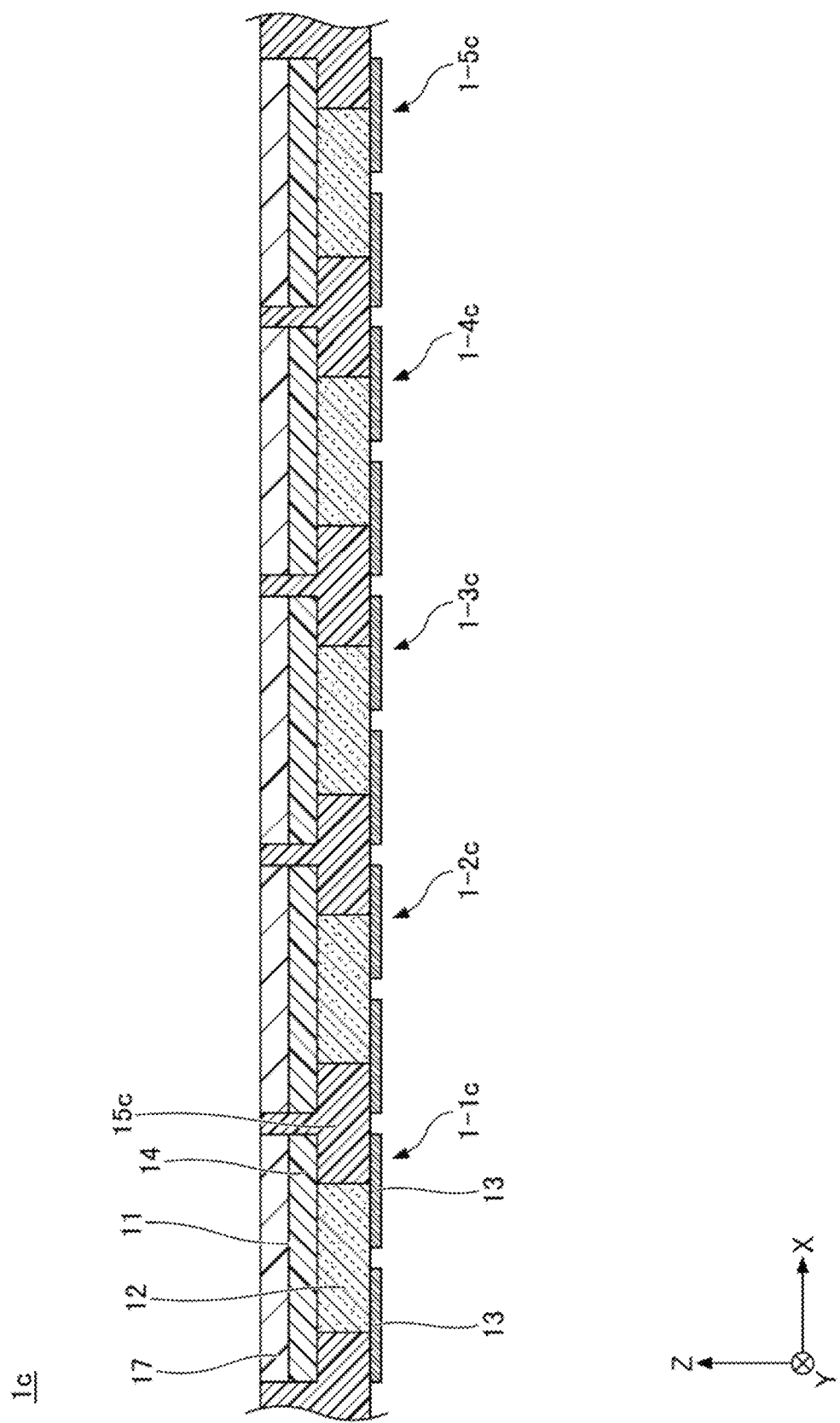
FIG. 6 is a cross-sectional view schematically illustrating a light source according to a third modification.

FIG. 6 is a cross-sectional view schematically illustrating an example configuration of a light source 1c according to a third modification. The light source 1c may include an optical member, but does not necessarily include an optical member. The light source 1c includes a plurality of light emitting elements 12 and a plurality of light transmissive members 14. Each of a light source 1-1c, a light source 1-2c, a light source 1-3c, a light source 1-4c, and a light source 1-5c is constituted by a corresponding light emitting element 12 and a corresponding light transmissive member 14. The light sources 1-1c to 1-5c serve as a plurality of light emitting parts of the light source 1c. Covering members 15c are disposed between adjacent light sources (light emitting parts) of the light source 1-1c, the light source 1-2c, the light source 1-3c, the light source 1-4c, and the light source 1-5c. The covering members 15c cover the side surfaces of light diffusion members 17, of the light transmissive members 14, and of the light emitting elements 12, except for the surfaces on the +Z side of the light diffusion members 17. The light source 1-1c, the light source 1-2c, the light source 1-3c, the light source 1-4c, and the light source 1-5c are an example of a plurality of light sources aligned in the X direction. The X direction is an example of a first direction.

The light source 1c includes the light source 1-1c, the light source 1-2c, the light source 1-3c, the light source 1-4c, the light source 1-5c, the covering members 15c, the light diffusion members 17, and electrodes 13. The electrodes 13 of the light source 1c may be electrodes of the light emitting elements 12 exposed from the covering members 15c. Alternatively, the electrodes 13 of the light source 1c may be other metal members covering electrodes of the light emitting elements 12 exposed from the covering members 15c. The light source 1-1c, the light source 1-2c, the light source 1-3c, the light source 1-4c, and the light source 1-5c may have the same configuration. Therefore, in FIG. 6, reference numerals are representatively assigned only to the light source 1-1c. The light transmissive members 14 are provided on the respective surfaces on the +Z side of the light emitting elements 12. The light diffusion members 17 are provided on the respective surfaces on the +Z side of the light transmissive members 14. The electrodes 13 are pairs of positive and negative electrodes provided on the surfaces on the opposite side of the light emitting elements 12 from light emitting surfaces 11.

The number of light sources included in the light source 1c is not limited to five, and any number of light sources may be included in the light source 1c. Further, the plurality of light sources may be aligned in the Y direction. The plurality of light sources may be aligned in both the X direction and the Y direction. The Y direction is an example of a second direction orthogonal to the first direction.

(Fourth Modification of Light Source 1)

Figure 7:
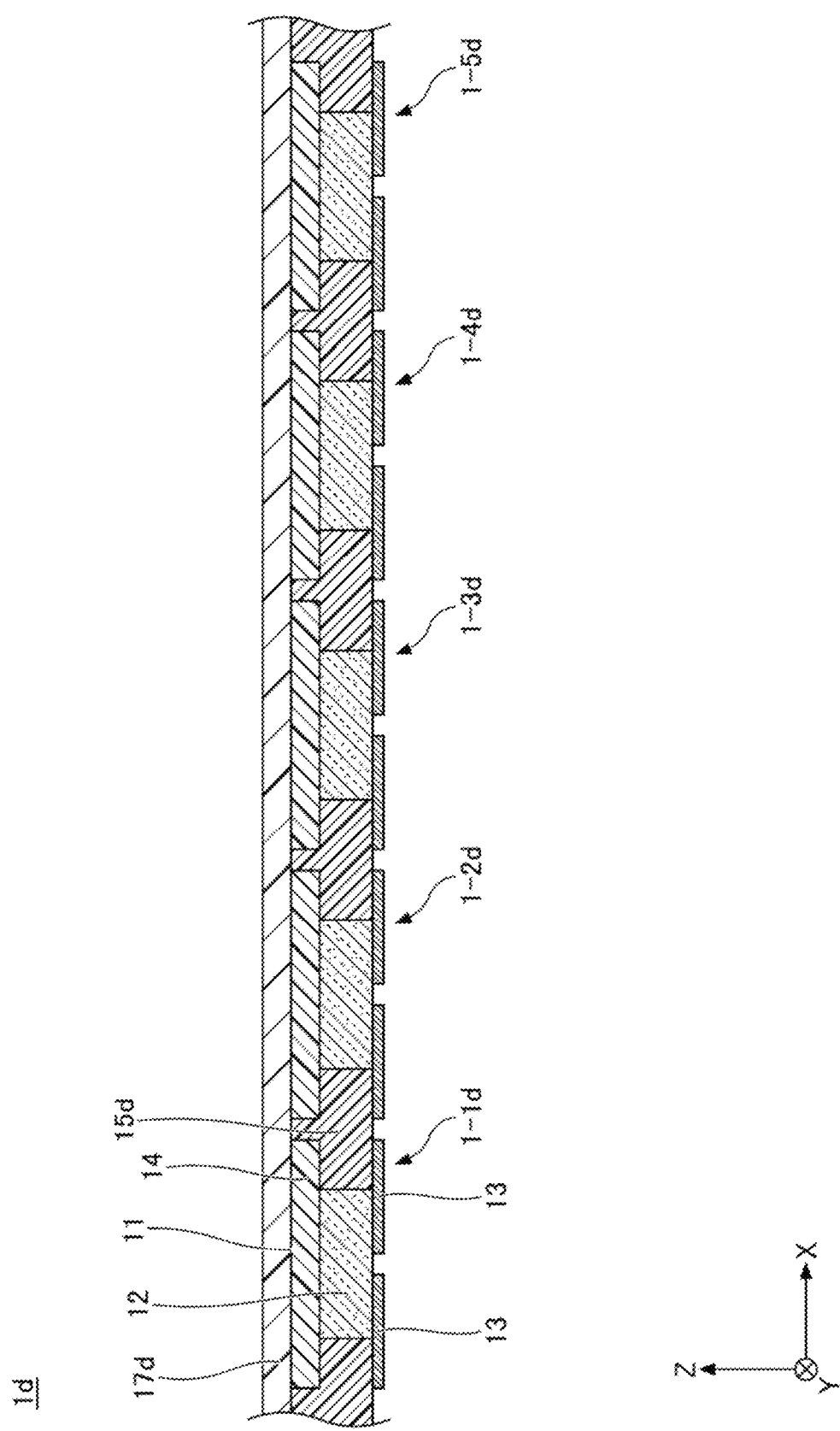
FIG. 7 is a cross-sectional view schematically illustrating a light source according to a fourth modification.

FIG. 7 is a cross-sectional view schematically illustrating an example configuration of a light source 1d according to a fourth modification. The light source 1d may include an optical member, but does not necessarily include an optical member. The light source 1d includes a plurality of light emitting elements 12 and a plurality of light transmissive members 14. Each of a light source 1-1d, a light source 1-2d, a light source 1-3d, a light source 1-4d, and a light source 1-5d is constituted by a corresponding light emitting element 12 and a corresponding light transmissive member 14. The light sources 1-1d to 1-5d serve as a plurality of light emitting parts of the light source 1d. Covering members 15d are disposed between adjacent light sources of the light source 1-1d, the light source 1-2d, the light source 1-3d, the light source 1-4d, and the light source 1-5d. The covering members 15d cover the side surfaces of the light transmissive members 14 and of the light emitting elements 12, except for the surfaces on the +Z side of the light transmissive members 14. The light source 1-1d, the light source 1-2d, the light source 1-3d, the light source 1-4d, and the light source 1-5d are an example of a plurality of light sources aligned in the X direction. A light diffusion member 17d is provided on the surfaces on the +Z side of the light source 1-1d, the light source 1-2d, the light source 1-3d, the light source 1-4d, and the light source 1-5d, and on the surfaces on the +Z side of the covering members 15d. That is, the light diffusion member 17d continuously covers the surfaces on the +Z side of the light transmissive members 14 and the surfaces on the +Z side of the covering members 15d disposed between adjacent light transmissive members.

The light source 1d includes the light source 1-1d, the light source 1-2d, the light source 1-3d, the light source 1-4d, the light source 1-5d, the covering members 15d, the light diffusion member 17d, and electrodes 13. The electrodes 13 of the light source 1d may be electrodes of the light emitting elements 12 exposed from the covering members 15d. Alternatively, the electrodes 13 of the light source 1d may be other metal members covering electrodes of the light emitting elements 12 exposed from the covering members 15d. The light source 1-1d, the light source 1-2d, the light source 1-3d, the light source 1-4d, and the light source 1-5d may have the same configuration. Therefore, in FIG. 7, reference numerals are representatively assigned only to the light source 1-1d. The light transmissive members 14 are provided on the respective surfaces on the +Z side of the light emitting elements 12. The electrodes 13 are pairs of positive and negative electrodes provided on the surfaces on the opposite side of the light emitting elements 12 from light emitting surfaces 11.

The number of light sources included in the light source 1d is not limited to five, and any number of light sources may be included in the light source 1d. Further, the plurality of light sources may be aligned in the Y direction. The plurality of light sources may be aligned in both the X direction and the Y direction.

(Other Modifications of Light Source 1)

The light source 1 may be configured with a light emitting element 12 and a pair of electrodes 13. Further, the light source 1 may be configured with a light emitting element 12, a light transmissive member 14, and a pair of electrodes 13. Further, the light source 1 may be configured with a light emitting element 12, a light transmissive member 14, a light diffusion member 17, and a pair of electrodes 13.

The light source 1 may include a plurality of light sources aligned in either the X direction or the Y direction or both in the X direction and the Y direction. Each of the light sources may be configured with a light emitting element 12 and a pair of electrodes 13. Further, each of the light sources may be configured with a light emitting element 12, a light transmissive member 14, and a pair of electrodes 13. Further, each of the light sources may be configured with a light emitting element 12, a light transmissive member 14, a light diffusion member 17, and a pair of electrodes 13.

Example of Change in State of First Lens 2

Figure 8A:
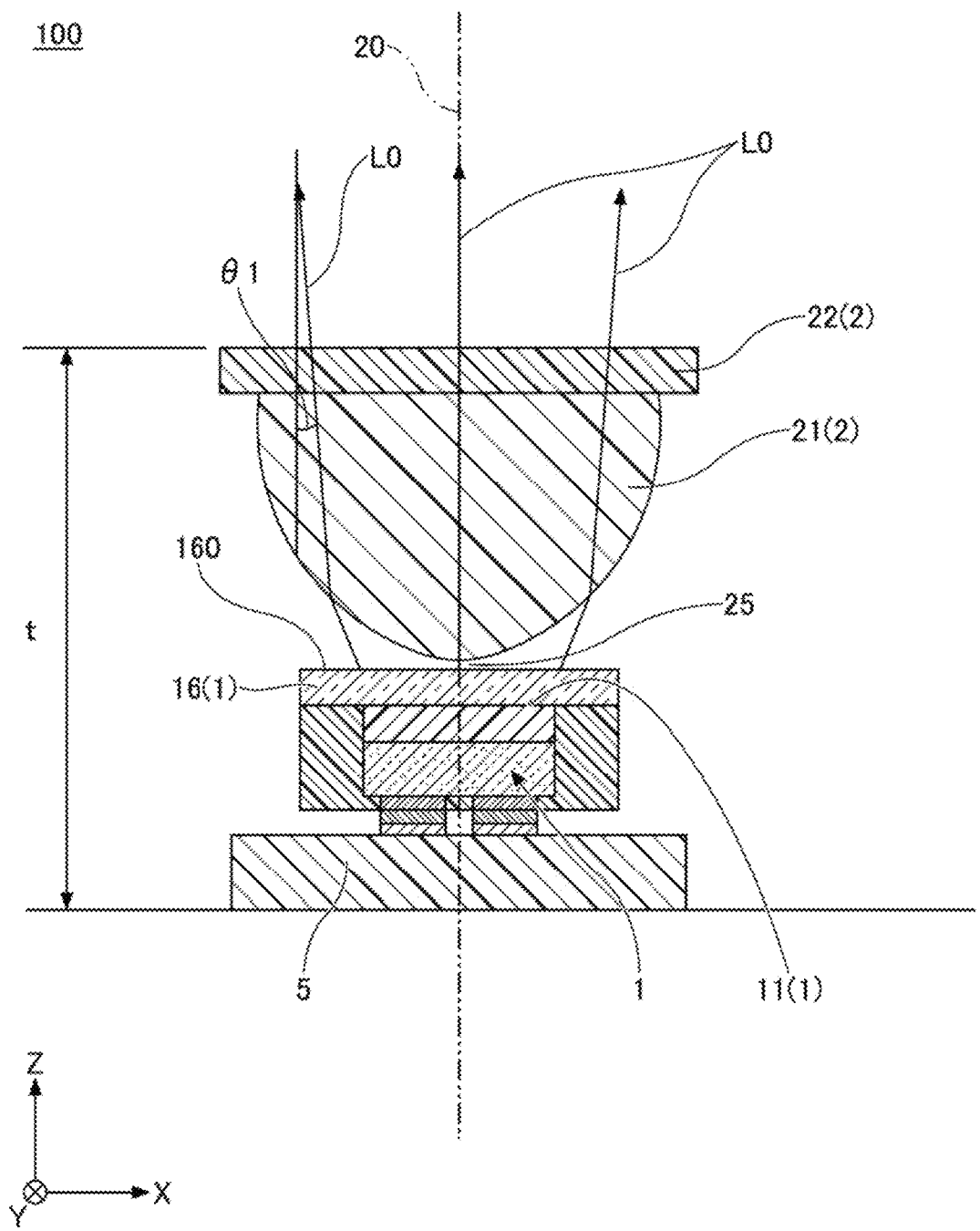
FIG. 8A is a first diagram schematically illustrating an example of a change in the state of a first lens of the light emitting module of FIG. 1.
Figure 8B:
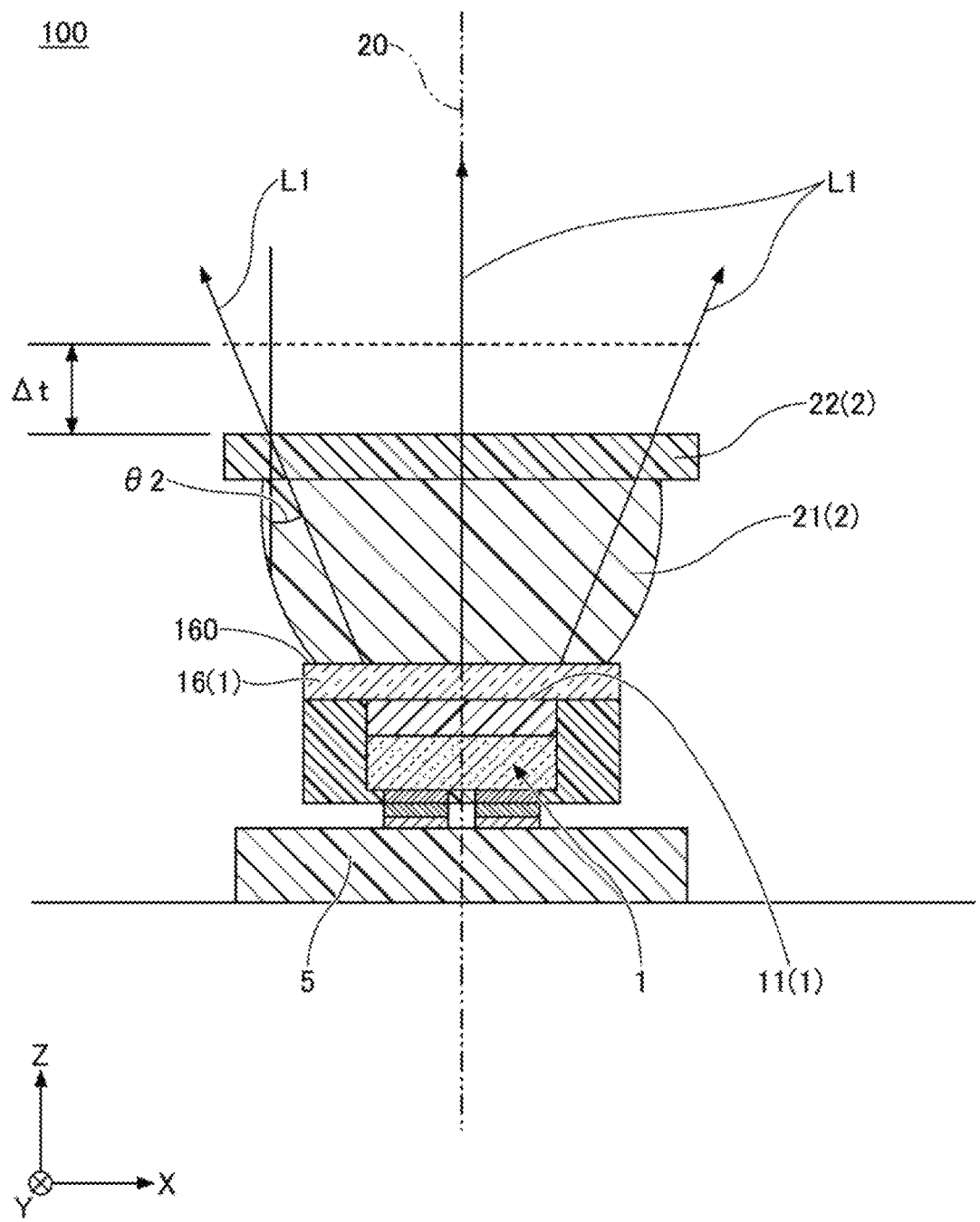
FIG. 8B is a second diagram schematically illustrating the example of the change in the state of the first lens of the light emitting module of FIG. 1.
Figure 9A:
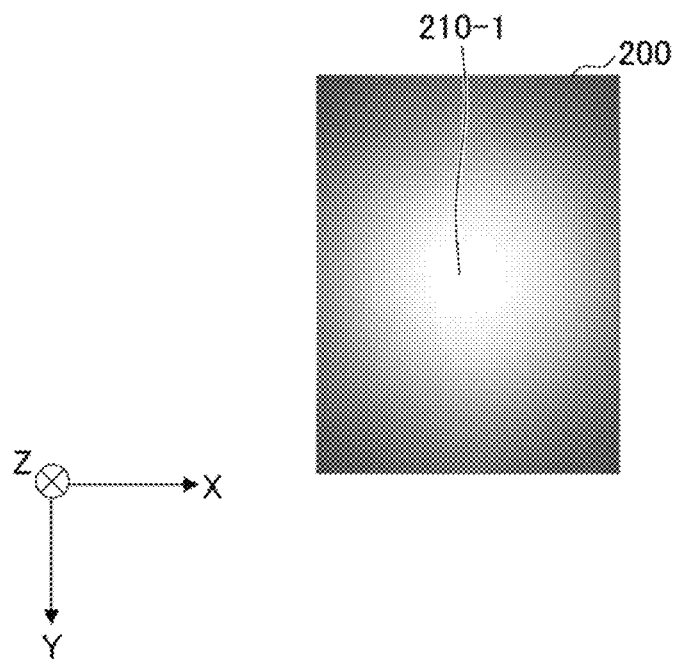
FIG. 9A is a schematic diagram illustrating an example of irradiation light in a state illustrated in FIG. 8A.
Figure 9B:
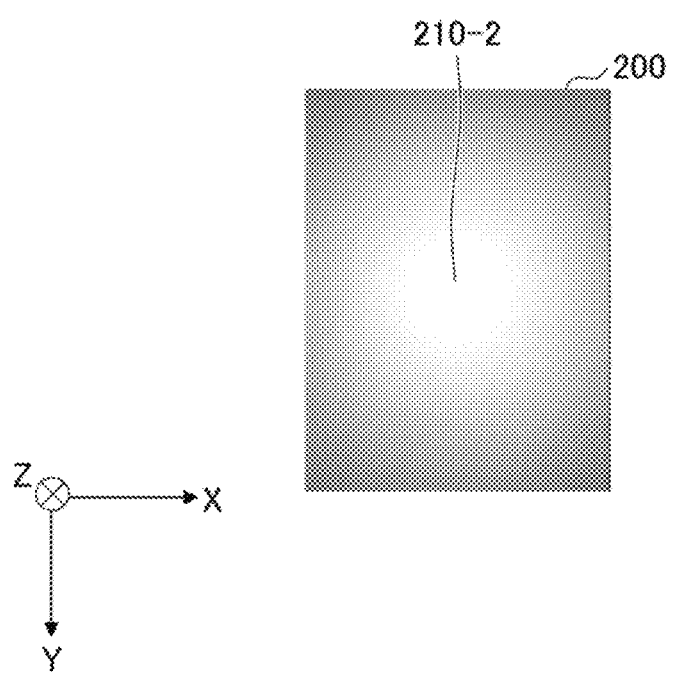
FIG. 9B is a schematic diagram illustrating an example of irradiation light in a state illustrated in FIG. 8B.

A change in the state of the first lens 2 will be described with reference to FIG. 8A through FIG. 9B. FIG. 8A and FIG. 8B are diagrams schematically illustrating an example of a change in the state of the first lens 2 of the light emitting module 100. The housing 4 and the actuator 3 are omitted in FIGS. 8A and 8B for the sake of brevity. FIG. 8A is a cross-sectional view of the light emitting module 100 before the state of the first lens 2 is changed. FIG. 8B is a cross-sectional view of the light emitting module 100 after the state of the first lens 2 is changed. FIG. 9A is a diagram illustrating an example of irradiation light in a state illustrated in FIG. 8A. FIG. 9B is a diagram illustrating an example of irradiation light in a state illustrated in FIG. 8B. The states illustrated in FIG. 8A and FIG. 8B are merely examples. FIG. 8B may illustrate the light emitting module before the state of the first lens 2 is changed, and FIG. 8A may illustrate the light emitting module after the state of the first lens 2 is changed. The same applies to cases in which a light emitting module before and after the state of a first lens is changed is illustrated in the following description. Note that, in practice, irradiation light is refracted at the interface between the first portion 21 and the second portion 22 and at the interface between the second portion 22 and air, but for the sake of simplicity, refraction of the irradiation light at these interfaces is not depicted in FIG. 8A and FIG. 8B.

In FIG. 8A, the first air layer 25 is present between the contact portion 160 of the light source 1 and the first lens 2. That is, in the state (example of a first state) illustrated in FIG. 8A, the first lens 2 is spaced apart from the light source 1, and the first air layer 25 is present between the first lens 2 and the contact portion 160. In the state illustrated in FIG. 8A, the first lens 2 does not contact the contact portion 160. Therefore, an external force that causes the first lens 2 to be electrically deformed is not applied to the first lens 2, and thus, the first lens 2 is not electrically deformed.

A length t represents the length from the lower surface of the mounting substrate 5 to the upper surface of the first lens 2 in the Z direction of the light emitting module 100. A first irradiation angle θ1 represents an irradiation angle of irradiation light from the light emitting module 100 in the state illustrated in FIG. 8A. In this example, the first irradiation angle θ1 is described as the maximum irradiation angle of irradiation light from the light emitting module 100. The maximum irradiation angle refers to an angle between a first line parallel to a line connecting a center position of the light emitting surface to a center illuminance position of irradiation light in the irradiation region; and a second line connecting an emission position, where light coming from a substantially end portion of the light emitting surface is emitted from the first lens 2, to a one-half illuminance position of the irradiation light in the irradiation region. The above emission position corresponds to an emission position of the outermost light of luminous flux emitted from the first lens 2. The one-half illuminance position refers to a position at which the illuminance becomes approximately one-half of the center illuminance of the irradiation light. However, the one-half illuminance position may be a position having any illuminance. For example, the one-half illuminance position may be a position at which the illuminance becomes approximately one-tenth or the like of the center illuminance of the irradiation light.

In the state illustrated in FIG. 8A, after light L0 from the light source 1 passes through the first air layer 25 and enters the first portion 21 of the first lens 2, the light L0 is transmitted through the inside of the first lens 2 and is emitted toward the irradiation region located on the +Z side of the first lens 2. Since the light L0 passes through the first air layer 25, the light L0 is transmitted through two optical interfaces before entering the first lens 2. At this time, the light L0 is refracted at the interface between the optical member 16 and the first air layer 25 and at the interface between the first air layer 25 and the first lens 2. That is, the light L0 is refracted twice before entering the first lens 2.

In FIG. 9A, an irradiation region 200 is irradiated with the light L0 from the light emitting module 100. The distribution of irradiation light 210-1 corresponds to the illuminance distribution of the light L0 emitted to the irradiation region 200.

Conversely, FIG. 8B illustrates a state (example of a second state) in which the first lens 2 in the state illustrated in FIG. 8A is moved by the actuator 3 of FIG. 2 in the −Z direction along the optical axis 20, and the first portion 21 contacts the contact portion 160. Since the first portion 21 contacts the contact portion 160, the first air layer 25 between the contact portion 160 and the first lens 2 is reduced in the state illustrated in FIG. 8B, as compared to the state in which the first air layer 25 is present between the contact portion 160 and the first lens 2 as illustrated in FIG. 8A. That is, in the light emitting module 100, the state of the first lens 2 relative to the contact portion 160 may include a state in which the first air layer 25 is present between the contact portion 160 and the first lens 2 as illustrated in FIG. 8A, and a state in which the first air layer 25 is reduced as illustrated in FIG. 8B. Upon the first portion 21 of the first lens 2 contacting the contact portion 160, an external force acting in the +Z direction is applied from the contact portion 160 to the first portion 21. In response to the external force, the first portion 21 is elastically deformed so as to contract in the Z direction.

The state in which the first air layer 25 is reduced includes a state in which no first air layer is present between the contact portion 160 and the first lens 2, and a state in which a first air layer is partially present on the contact surface between the contact portion 160 and the first lens 2. For example, the state in which a first air layer is partially present means that, in a state in which the first portion 21 of the first lens 2 contacts the contact portion 160, an air layer is present therebetween due to the surface shape, the surface roughness, and the like of each of the contact portion 160 and the first lens 2.

The amount of change Δt represents the amount of change in the length of the first lens 2 caused by the movement of the first lens 2 toward the contact portion 160 and the amount of change in the length of the first lens 2 caused by the elastic deformation of the first lens 2. The length t from the lower surface of the mounting substrate 5 to the upper surface of the first lens 2 in the light emitting module 100 is reduced by the amount of change Δt, as compared to when the first lens 2 does not contact the contact portion 160. A second irradiation angle θ2 represents the maximum irradiation angle of irradiation light from the light emitting module 100 in the state illustrated in FIG. 8B. In the examples of FIG. 8A and FIG. 8B, the second irradiation angle θ2 is larger than the first irradiation angle θ1.

In the state illustrated in FIG. 8B, light L1 from the light source 1 can directly enter the first lens 2 from the optical member 16 without passing through an air layer. Then, the light L1 is transmitted through the inside of the first lens 2, and is emitted toward the irradiation region located on the +Z side of the first lens 2. When the light L1 directly enters the first lens 2 from the optical member 16 without passing through an air layer, the light L1 is transmitted through one optical interface before entering the first lens 2. At this time, the light L1 is refracted only at the interface between the optical member 16 and the first lens 2. That is, the light L1 is refracted once before entering the first lens 2. Further, the surface of the first lens 2 that contacts the contact portion 160 becomes nearly flat conforming to the shape of the contact portion 160. Unlike a case where the first lens 2 does not contact the optical member 16, the light is not substantially affected by the curvature of the surface of the first lens 2. For these reasons, the light distribution of the irradiation light from the light emitting module 100 in the state illustrated in FIG. 8B differs from the light distribution of the irradiation light from the light emitting module 100 in the state illustrated in FIG. 8A.

In FIG. 9B, the irradiation region 200 is irradiated with the light L1 from the light emitting module 100. The distribution of irradiation light 210-2 corresponds to the illuminance distribution of the light L1 emitted to the irradiation region 200. In the state illustrated in FIG. 9B, since the light L1 is refracted once and the surface of the first lens 2 is nearly flat, the second irradiation angle θ2 becomes larger than the first irradiation angle θ1. Accordingly, the light emitting module 100 can change the light distribution of irradiation light such that, in the irradiation region 200, the region of the irradiation light 210-2 as illustrated in FIG. 9B becomes wider than the region of the irradiation light 210-1 as illustrated in FIG. 9A.

For example, even in a case where the first lens 2 is moved in the direction along the optical axis 20 in a state in which the first lens 2 does not contact the light source 1, the distance between the first lens 2 and the light source 1 is changed by the movement of the first lens 2. It is conceivable that the light distribution of irradiation light from the light emitting module 100 can be changed according to the change in the distance between the first lens 2 and the light source 1. For example, the first lens 2 can be moved in the +Z direction in a state in which the first lens 2 comes closest to the light source 1, but does not contact the light source 1. However, in this case, the sum of the length from the lower surface of the mounting substrate 5 to the upper surface of the first lens 2 that comes closest to the light source 1 and the amount of movement of the first lens 2 in the +Z direction would be required as at least the thickness of the light emitting module 100, that is, as the length of the light emitting module 100 in the direction along the optical axis 20.

Conversely, according to the present embodiment, the state of the first lens 2 relative to the contact portion 160 is changed by the movement of the first lens 2. For example, upon the first lens 2 contacting the contact portion 160, the state of the first lens 2 relative to the contact portion 160 is changed by the first lens 2 being elastically deformed so as to contract in the direction along the optical axis 20. The change in the state of the first lens 2 allows the light emitting module 100 to change the light distribution of irradiation light. Therefore, in the light emitting module 100 according to the present embodiment, it is not required to secure a length by which the first lens 2 is moved in order to change the light distribution of irradiation light, and thus, the thickness of the light emitting module 100 can be reduced. As described, according to the present embodiment, the light emitting module 100 having a reduced thickness can be provided.

In the present embodiment, the state of the first lens 2 relative to the contact portion 160 may include a state in which the first air layer 25 is present between the contact portion 160 and the first lens 2, and a state in which the first air layer 25 between the contact portion 160 and the first lens 2 is reduced. Accordingly, as compared to when the first lens 2 is moved in the direction along the optical axis 20 (for example, in the +Z direction), the light distribution of irradiation light can be greatly changed in a state in which the first air layer 25 between the contact portion 160 and the first lens 2 is reduced. That is, the light distribution of irradiation light can be greatly changed depending on whether the irradiation light is refracted at the interface between the first air layer 25 and the first lens 2. Accordingly, the light emitting module 100 having a reduced thickness can greatly change light distribution, thereby obtaining desired light distribution.

Further, in the present embodiment, the state of the first lens 2 relative to the contact portion 160 may include a state in which the first lens 2 contacts only a portion of the contact portion 160. Light entering the first lens 2 from the light source 1 in this state includes both the light L0 that passes through the air layer and is transmitted through the two optical interfaces, and the light L1 that is transmitted through the one optical interface without passing through the air layer. Accordingly, desired light distribution can be obtained.

Further, the hardness of the contact portion 160 is preferably higher than the hardness of the first portion 21 in FIG. 8A and FIG. 8B. For example, if the hardness of the contact portion 160 is equal to or lower than the hardness of the first portion 21, both the first portion 21 and the contact portion 160 may be deformed upon the first portion 21 contacting the contact portion 160. The manner in which light is refracted differs depending on either the first portion 21 or the contact portion 160 being deformed. Thus, in the above case, control of light refraction at the interface between the first portion 21 and the contact portion 160 would be complicated.

Further, if a material that is not easily elastically deformed is used for the contact portion 160, the contact portion 160 would be damaged by the deformation of the contact portion 160. However, by setting the hardness of the contact portion 160 to be equal to or higher than the hardness of the first portion 21, damage to the contact portion 160 can be reduced.

By setting the hardness of the contact portion 160 to be higher than the hardness of the first portion 21, damage to the contact portion 160 can be reduced. That is, when the first portion 21 contacts the contact portion 160, the first portion 21 is mainly deformed. Thus, light refraction at the interface between the first portion 21 and the contact portion 160 can be easily controlled. As a result, desired irradiation light can be easily obtained in the irradiation region 200.

Modifications of First Lens 2

Modifications of the first lens 2 will be described with reference to FIG. 10A through FIG. 11B. The modifications of the first lens 2 are not only modifications of the first lens according to the first embodiment, but may also be modifications of first lenses according to the second embodiment through the fourth embodiment, which will be described later. The illustration of the housing 4 and the actuator 3 are omitted in all the subsequent embodiments and modifications for the sake of brevity.

(First Modification of First Lens 2)

Figure 10A:
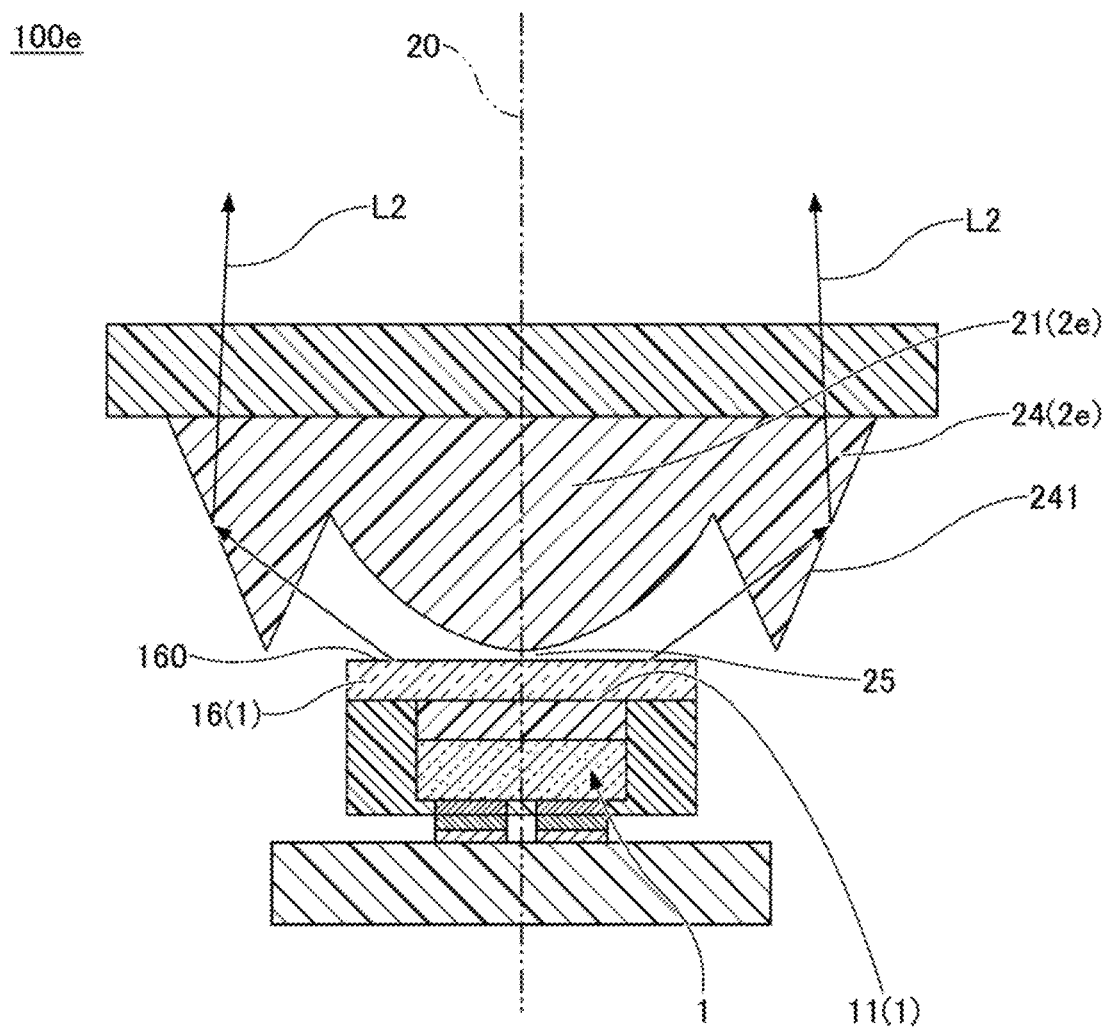
FIG. 10A is a first diagram schematically illustrating a first lens according to a first modification and an example of a change in the state of the first lens.
Figure 10B:
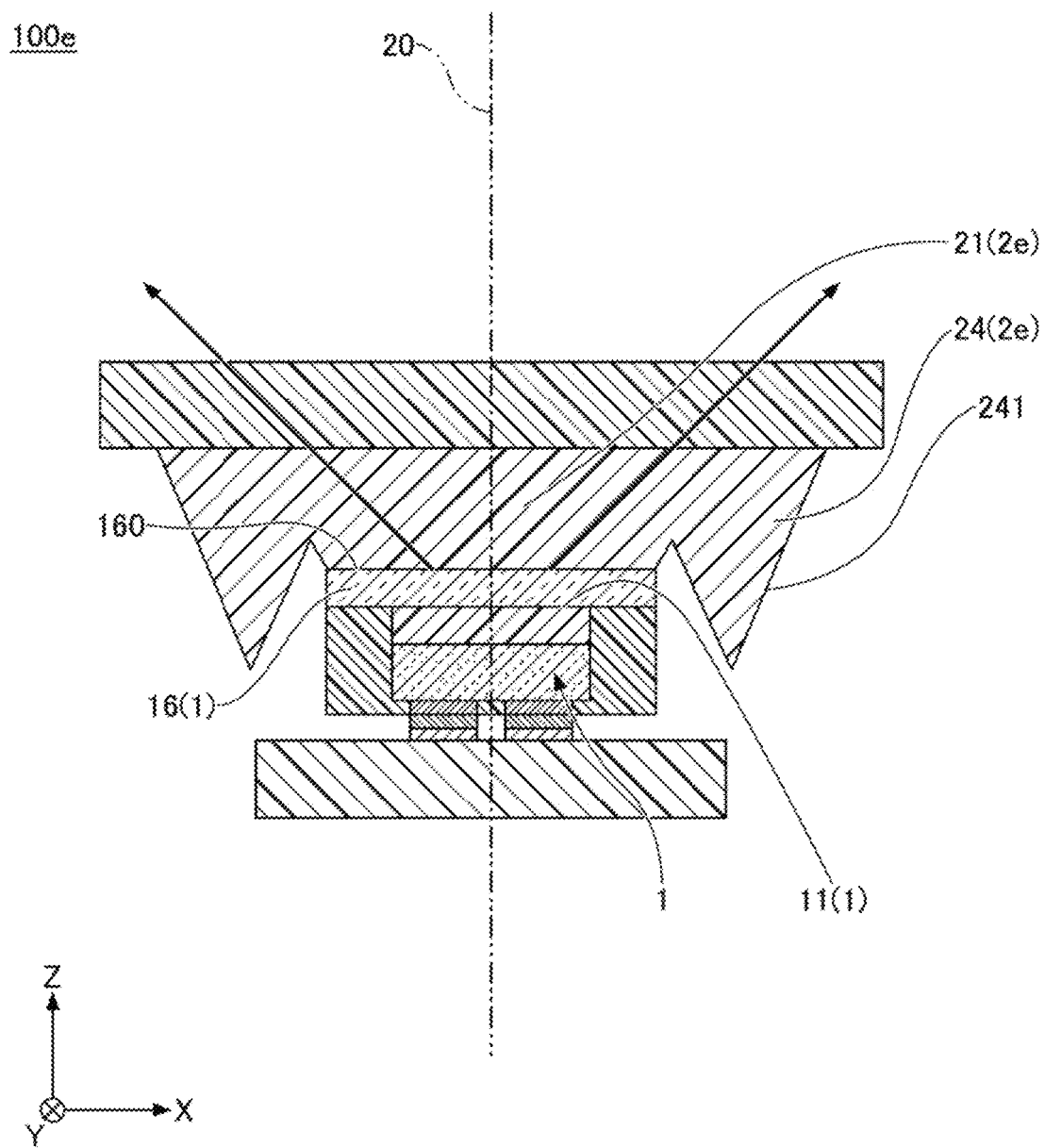
FIG. 10B is a second diagram schematically illustrating the first lens according to the first modification and the example of the change in the state of the first lens.

FIG. 10A and FIG. 10B are diagrams schematically illustrating a first lens 2e according to a first modification and an example of a change in the state of the first lens 2e. A light emitting module 100e includes the first lens 2e. The configuration of the light emitting module 100e other than the first lens 2e may be the same as the configuration of the light emitting module 100. FIG. 10A is a cross-sectional view of the light emitting module 100e before the state of the first lens 2e is changed. FIG. 10B is a cross-sectional view of the light emitting module 100e after the state of the first lens 2e is changed.

As illustrated in FIG. 10A and FIG. 10B, the first lens 2e includes a first portion 21 and a third portion 24. The first portion 21 is elastically deformable and is configured to contact the contact portion 160. The third portion 24 is provided around the first portion 21 in a top view. The third portion 24 includes a reflective portion 241. The outer shape of each of the third portion 24 and the reflective portion 241 is a substantially circular shape in a top view. The reflective portion 241 is disposed outward relative to the light emitting surface 11 in a top view.

In FIG. 10A, a first air layer 25 is present between the contact portion 160 and the first lens 2e in the light source 1. In a state illustrated in FIG. 10A, the contact portion 160 and the first lens 2e do not contact each other. Therefore, an external force that causes the first lens 2e to be elastically deformed is not applied to the first lens 2e, and thus, the first lens 2e is not elastically deformed.

In the state illustrated in FIG. 10A, light that enters the first portion 21 from the light source 1 behaves in a substantially similar manner as the light L0 illustrated in FIG. 8A. The light is transmitted through the inside of the first lens 2e, and emitted toward an irradiation region located on the +Z side of the first lens 2e. Further, in FIG. 10A, light L2 incident on the third portion 24, of the light from the light emitting surface 11, is transmitted through the inside of the third portion 24, reaches the reflective portion 241, and is reflected by the reflective portion 241. The reflection by the reflective portion 241 is, for example, total reflection. After the light L2 reflected by the reflective portion 241 is transmitted through the inside of the first lens 2e, the light L2 is emitted toward the irradiation region located on the +Z side of the first lens 2e.

Conversely, FIG. 10B illustrates a state in which the first lens 2e in the state illustrated in FIG. 10A is moved by the actuator 3 of FIG. 2 in the −Z direction along the optical axis 20, and the first portion 21 contacts the contact portion 160. Upon the first portion 21 of the first lens 2e contacting the contact portion 160, an external force acting in the +Z direction is applied from the contact portion 160 to the first portion 21. In 13 response to the external force, the first portion 21 is elastically deformed so as to contract in the Z direction.

In the state illustrated in FIG. 10B, light that enters the first portion 21 from the light source 1 behaves in a substantially similar manner as the light L1 illustrated in FIG. 8B. The light is transmitted through the inside of the first lens 2e, and emitted toward an irradiation region located on the +Z side of the first lens 2e. The light distribution of the irradiation light from the light emitting module 100e in the state illustrated in FIG. 10B differs from the light distribution of the irradiation light from the light emitting module 100e in the state illustrated in FIG. 10A.

In practice, the irradiation light is refracted at the interface between the first portion 21 and the second portion 22 and at the interface between the second portion 22 and air, but for the sake of simplicity, refraction of the irradiation light at these interfaces is not depicted in FIG. 10A and FIG. 10B.

In the light emitting module 100e, of the light from the light emitting surface 11, the light L2 that travels outside the first portion 21 of the first lens 2e and does not incident on the first portion 21 can be reflected by the reflective portion 241. Since the light L2 can be utilized for the light distribution of the irradiation light from the light emitting module 100e, the light extraction efficiency of the light emitting module 100e can be improved.

(Second Modification of First Lens 2)

Figure 11A:
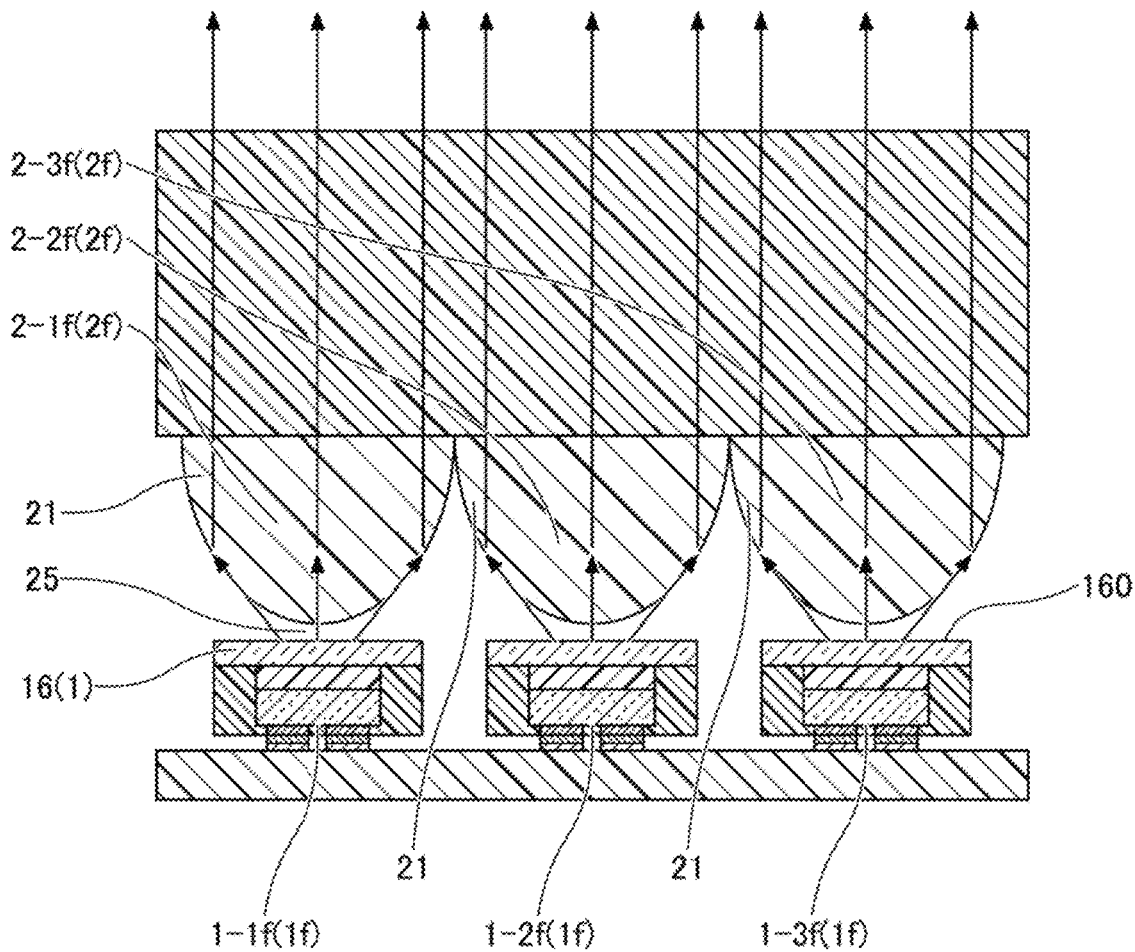
FIG. 11A is a first diagram schematically illustrating a first lens according to a second modification and an example of a change in the state of the first lens.
Figure 11B:
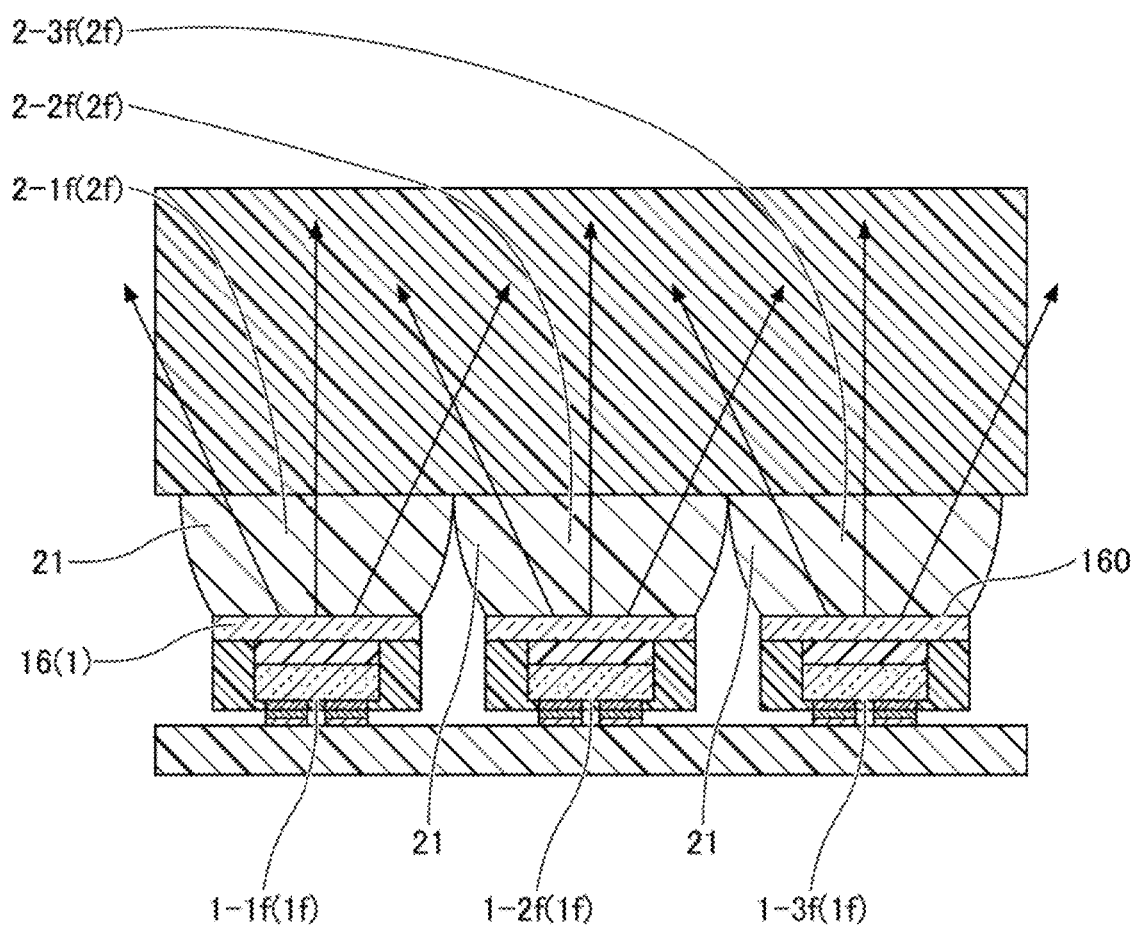
FIG. 11B is a second diagram schematically illustrating the first lens according to the second modification and the example of the change in the state of the first lens.

FIG. 11A and FIG. 11B are diagrams schematically illustrating a first lens 2f according to a second modification and an example of a change in the state of the first lens 2f. FIG. 11A is a cross-sectional view of a light emitting module 100f before the state of the first lens 2f is changed. FIG. 11B is a cross-sectional view of the light emitting module 100f after the state of the first lens 2f is changed. The light emitting module 100f includes a light source 1f and the first lens 2f. The light source if includes a plurality of light emitting parts, and the first lens 2f includes a plurality of lens parts arranged in one-to-one correspondence with the light emitting parts. The configuration of the light emitting module 100f other than the light source 1f and the first lens 2f may be the same as the configuration of the light emitting module 100.

The light source 1f includes, as the plurality of light emitting parts, a light source 1-1f, a light source 1-2f, and a light source 1-3f. The light source 1-1f, the light source 1-2f, and the light source 1-3f are an example of a plurality of light sources aligned in the X direction. The light source 1f may include a plurality of light sources aligned in the Y direction. Further, the light source 1f may include a plurality of light sources aligned in the X direction and the Y direction. The configuration and the functions of each of the light source 1-1f, the light source 1-2f, and the light source 1-3f may be the same as the configuration and the functions of the above-described light source 1.

The first lens 2f includes a first lens 2-1f, a first lens 2-2f, and a first lens 2-3f. The first lens 2-1f, the first lens 2-2f, and the first lens 2-3f are an example of a plurality of first lenses arranged in one-to-one correspondence with the plurality of light sources. The first lens 2f may include a plurality of first lenses aligned in the Y direction in accordance with the light source 1f. Further, the first lens 2f may include a plurality of first lenses aligned in the X direction and the Y direction in accordance with the light source 1f. The configuration and the functions of each of the first lens 2-1f, the first lens 2-2f, and the first lens 2-3f may be the same as the configuration and the functions of the above-described first lens 2.

The first lens 2-1f, the first lens 2-2f and the first lens 2-3f are integrally formed. In other words, the first lens 2-1f, the first lens 2-2f and the first lens 2-3f are connected. The first lens 2-1f, the first lens 2-2f and the first lens 2-3f are configured to include a resin material, and can be integrally formed by a molding process or the like.

In FIG. 11A, first air layers 25 are present between contact portions 160 of optical members 16 of the light source 1-1f, the light source 1-2, and the light source 1-3f versus the first lens 2-1f, the first lens 2-2f, and the first lens 2-3f. That is, in the state illustrated in FIG. 11A, the first lens 2-1f, the first lens 2-2*f*, and the first lens 2-3*f* do not contact the respective contact portions 160. Accordingly, external forces that cause the first lens 2-1*f*, the first lens 2-2*f*, and the first lens 2-3*f* to be elastically deformed are not applied to the first lens 2-1*f*, the first lens 2-2*f*, and the first lens 2-3*f*, and thus, the first lens 2-1*f*, the first lens 2-2*f*, and the first lens 2-3*f* are not elastically deformed.

In the state illustrated in FIG. 11A, light that enters first portions 21 of the first lens 2-1*f*, the first lens 2-2*f*, and the first lens 2-3 respectively from the light source 1-1*f*, the light source 1-2*f*, and the light source 1-3*f* behaves in a substantially similar manner as the light L0 illustrated in FIG. 8A. The light transmitted through the inside of each of the first lens 2-1*f*, the first lens 2-2*f*, and the first lens 2-3*f* is emitted toward an irradiation region located on the +Z side of the first lens 2*f*.

Conversely, FIG. 11B illustrates a state in which the first lens 2*f* in the state illustrated in FIG. 11A is moved by the actuator 3 of FIG. 2 in the −Z direction along the optical axis 20, and the first portions 21 of the first lens 2-1*f*, the first lens 2-2*f*, and the first lens 2-3*f* contact the respective contact portions 160. As a result, external forces acting in the +Z direction are applied from the contact portions 160 to the first portions 21. In response to the external forces, the respective first portions 21 of the first lens 2-1*f*, the first lens 2-2*f*, and the first lens 2-3*f* are elastically deformed so as to contract in the Z direction.

In the state illustrated in FIG. 11B, light that enters the first lens 2-1*f*, the first lens 2-2*f*, and the first lens 2-3 respectively from the light source 1-1*f*, the light source 1-2*f*, and the light source 1-3*f* behaves in a substantially similar manner as the light L1 illustrated in FIG. 8B. The light transmitted through the inside of the first lens 2-1*f*, the first lens 2-2*f*, and the first lens 2-3*f* is emitted toward the irradiation region located on the +Z side of the first lens 2*f*. The light distribution of the irradiation light from the light emitting module 100*f* in the state illustrated in FIG. 11B differs from the light distribution of the irradiation light from the light emitting module 100*f* in the state illustrated in FIG. 11A. In practice, the irradiation light is refracted at the interface between each of the first portions 21 and a second portion 22 and at the interface between the second portion 22 and air, but for the sake of simplicity, refraction of the irradiation light at these interfaces is not depicted in FIG. 11A and FIG. 11B.

The light emitting module 100*f* can achieve desired light distribution by using the plurality of light sources and the plurality of first lenses.

Second Embodiment

Example Configuration of Light Source 1*g*

Figure 12:
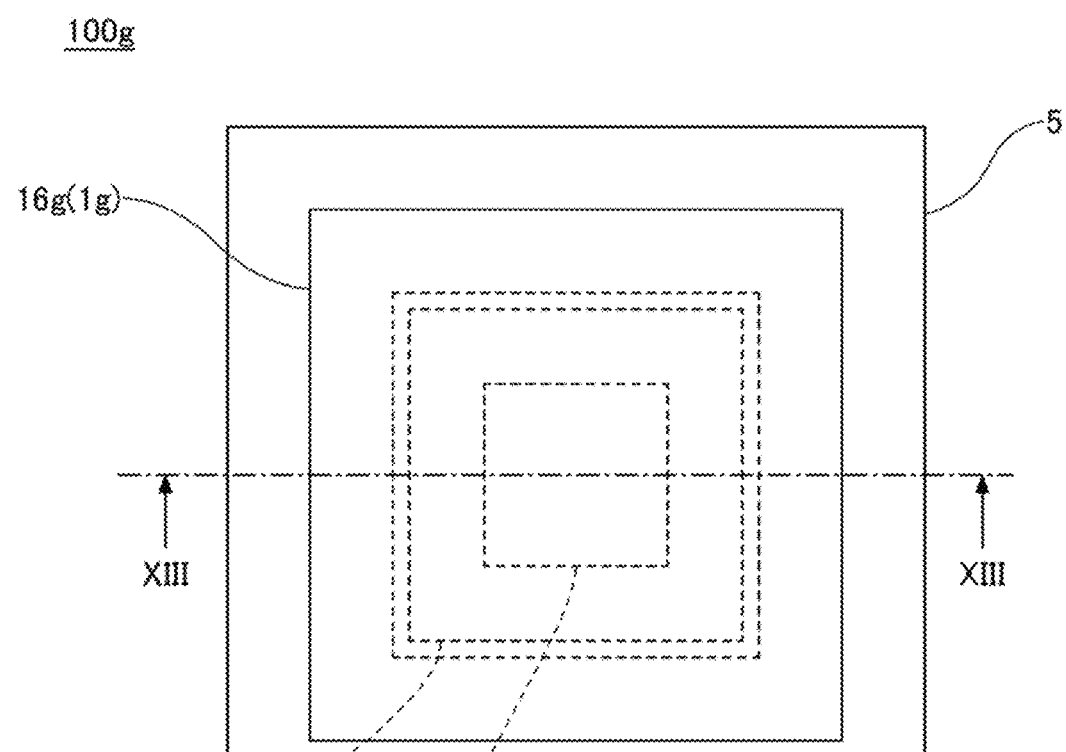
FIG. 12 is a top view schematically illustrating an example of a light source of a light emitting module according to a second embodiment.
Figure 12:
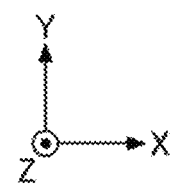
Figure 13:
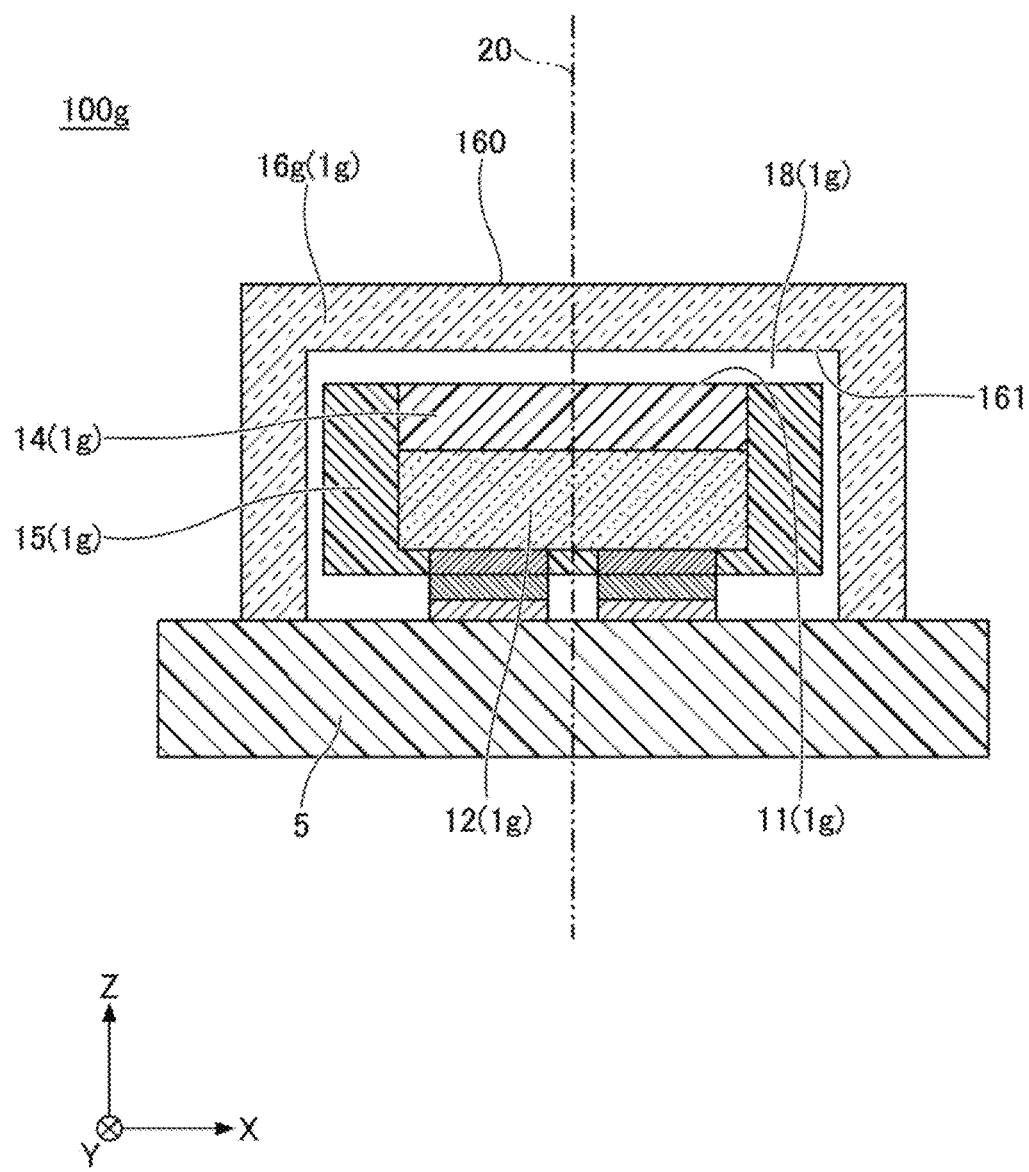
FIG. 13 is a cross-sectional view of the light emitting module taken through XIII-XIII of FIG. 12.

Next, a light emitting module according to a second embodiment will be described. FIG. 12 and FIG. 13 are diagrams schematically illustrating an example of a light source 1*g* of a light emitting module 100*g* according to the second embodiment. FIG. 12 is a top view schematically illustrating the light source 1*g* of the light emitting module 100*g*. FIG. 13 is a cross-sectional view of the light emitting module 100*g* taken through XIII-XIII of FIG. 12. The configuration of the light emitting module 100*g* other than the light source 1*g* may be the same as the configuration of the above-described light emitting module 100.

As illustrated in FIG. 12 and FIG. 13, the light source 1*g* includes the light emitting element 12, the light transmissive member 14, the covering member 15, an optical member 16*g*, and a second air layer 18. The optical member 16*g* is disposed on the upper surface (on the +Z side) of the mounting substrate 5 such that the light emitting element 12, the light transmissive member 14, and the covering member 15 are housed within the optical member 16*g*. The second air layer 18 is located between the light emitting surface 11 and the optical member 16*g* in the direction along the optical axis 20 (see FIG. 2). The optical member 16*g* has a contact portion 160 and an opposite surface 161 opposite the contact portion 160. In the optical member 16*g*, the contact portion 160 is the upper surface (on the +Z side) of the optical member 16*g*, and the opposite surface 161 is the lower surface (on the −Z side) of the optical member 16*g*. The opposite surface 161 faces the light emitting surface 11 with the second air layer 18 being interposed therebetween.

Since the light source 1*g* has the second air layer 18 between the light emitting element 12 and the optical member 16*g*, the light emitting module 100*g* can reduce transmission of heat, generated due to the light emitting element 12, from the light emitting surface 11 to the optical member 16. Accordingly, a situation in which heat generated from the light emitting surface 11 or the like is transmitted to the first lens 2 that is to be in contact with the contact portion 160 can be suppressed. In addition, deterioration of or damage to the first lens 2 due to heat can be reduced. Further, since the light source 1*g* has the second air layer 18, the light emitting module 100*g* can suppress a situation in which the force, with which the first lens 2 contacts the contact portion 160, is applied to the light emitting surface 11 via the optical member 16*g*. Accordingly, damage to the light emitting surface 11 or the like or a change in the shape of the light emitting surface 11 or the like due to the force with which the first lens 2 contacts the contact portion 160 can be reduced.

Modifications of Light Source 1*g*

Modifications of the light source 1*g* will be described with reference to FIG. 14A through FIG. 16B. The description of the same components as those of the above-described light source 1*g* will be omitted as appropriate.

(First Modification of Light Source 1*g*)

Figure 14A:
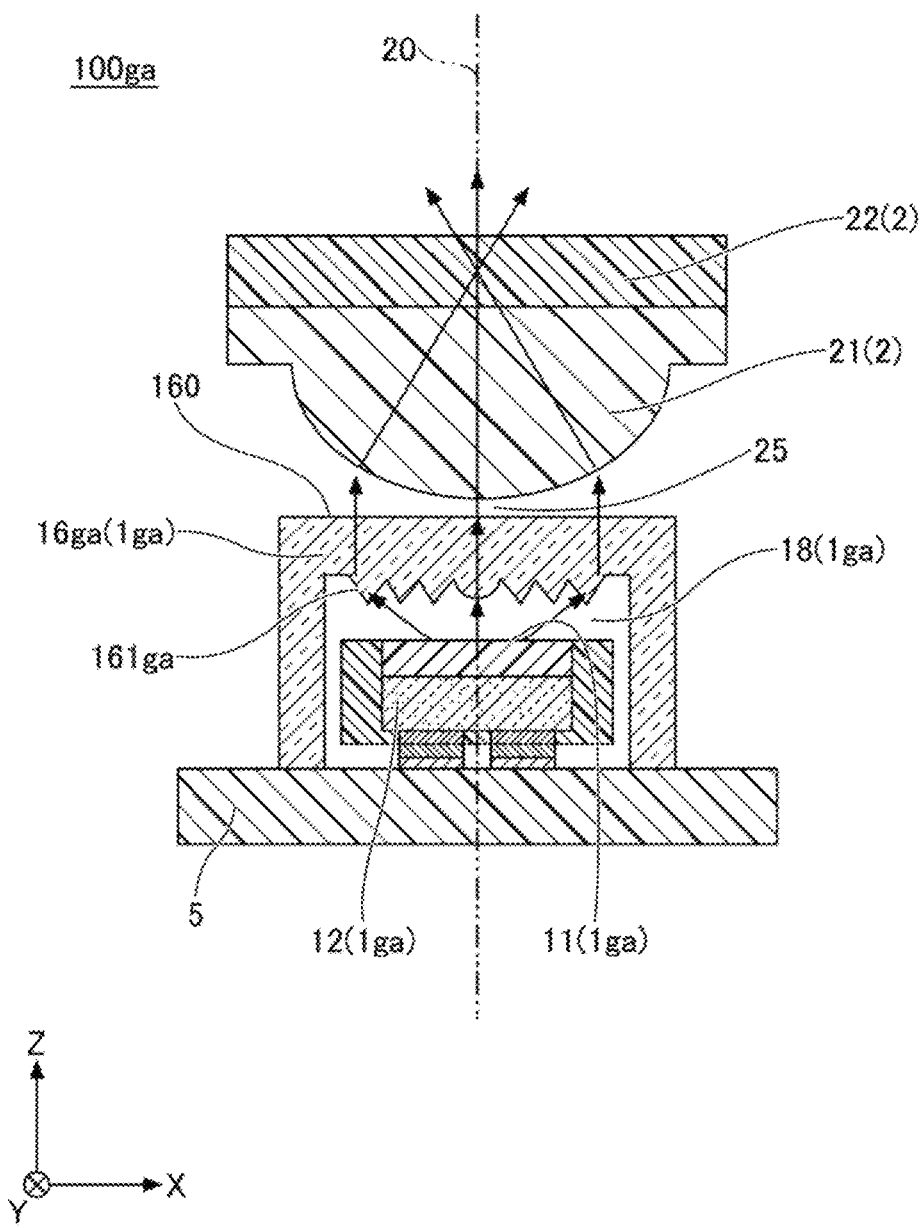
FIG. 14A is a first diagram schematically illustrating a light source according to a first modification of the second embodiment.
Figure 14B:
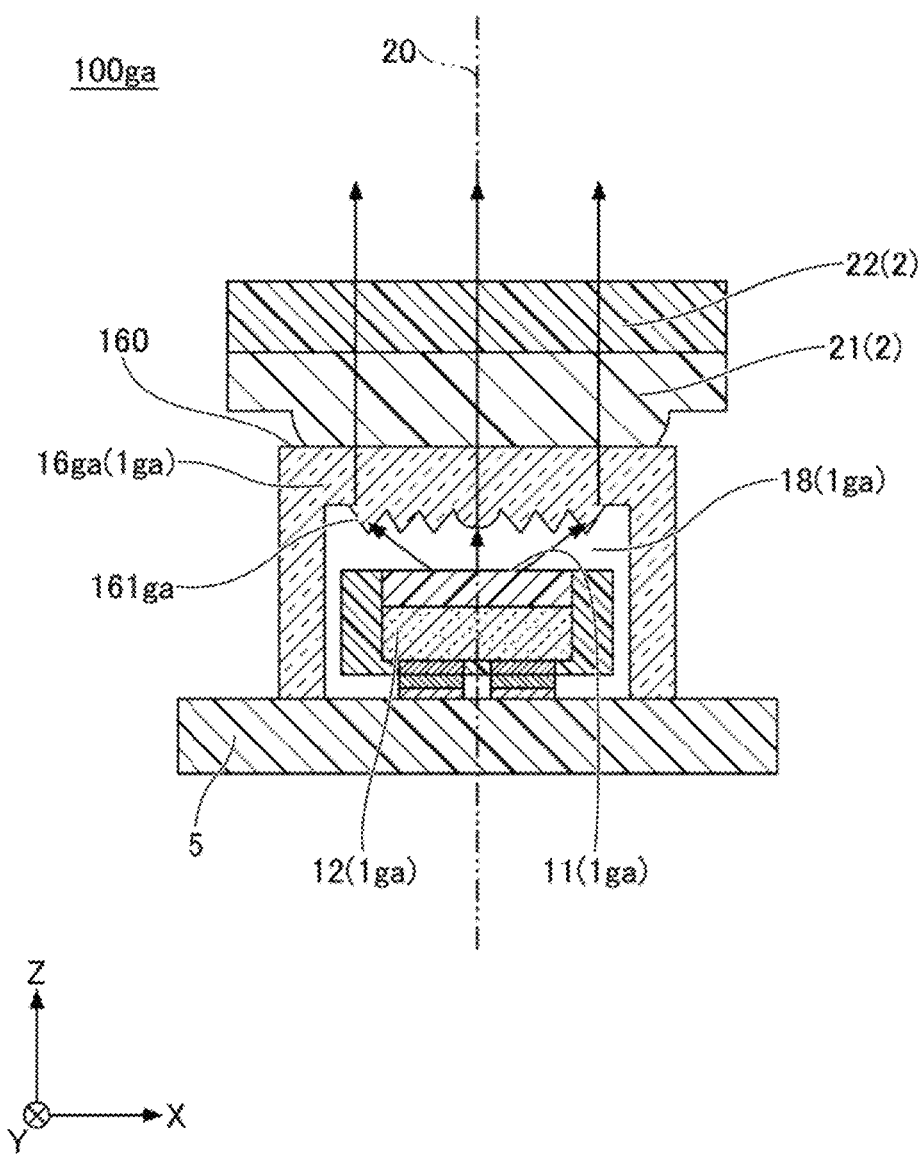
FIG. 14B is a second diagram schematically illustrating the light source according to the first modification of the second embodiment.

FIG. 14A and FIG. 14B are diagrams schematically illustrating a light source 1*ga* according to a first modification of the light source 1*g*. A light emitting module 100*ga* includes the light source 1*ga*. The configuration of the light emitting module 100*ga* other than the light source 1*ga* may be the same as the configuration of the light emitting module 100. FIG. 14A is a cross-sectional view of the light emitting module 100*ga* before the state of the first lens 2 is changed. FIG. 14B is a cross-sectional view of the light emitting module 100*ga* after the state of the first lens 2 is changed. As illustrated in FIG. 14A and FIG. 14B, the light source 1*ga* includes an optical member 16*ga*.

The optical member 16*ga* is disposed on the upper surface of the mounting substrate 5 such that the light emitting element 12, the light transmissive member 14, and the covering member 15 are housed within the optical member 16*ga*. In the optical member 16*ga*, a Fresnel lens surface 161*ga* faces the light emitting surface 11 with the second air layer 18 being interposed therebetween. The Fresnel lens surface is a lens surface whose thickness is reduced by dividing a curved surface such as a concave surface, a convex surface, or the like into concentric regions. The Fresnel lens surface 161*ga* is disposed on the opposite side of the optical member 16*ga* from the contact portion 160.

In a state illustrated in FIG. 14A, light from the light emitting surface 11 is refracted or reflected by the Fresnel lens surface 161*ga*, is transmitted through the inside of the optical member 16ga, and then enters the first lens 2 through the contact portion 160 and the first air layer 25. The light that has entered the first lens 2 is transmitted through the inside of the first lens 2, and is emitted toward an irradiation region located on the +Z side of the first lens 2.

Conversely, FIG. 14B illustrates a state in which the first lens 2 in the state illustrated in FIG. 14A is moved by the actuator 3 of FIG. 2 in the −Z direction along the optical axis 20, and the first portion 21 contacts the contact portion 160. Upon the first portion 21 of the first lens 2 contacting the contact portion 160, an external force acting in the +Z direction is applied from the contact portion 160 to the first portion 21. In response to the external force, the first portion 21 is elastically deformed so as to contract in the Z direction.

In the state illustrated in FIG. 14B, light from the light emitting surface 11 is refracted or reflected by the Fresnel lens surface 161ga, is transmitted through the inside of the optical member 16ga, and then enters the first lens 2 through the contact portion 160. The light that has entered the first lens 2 is transmitted through the inside of the first lens 2, and is emitted toward the irradiation region located on the +Z side of the first lens 2. The light distribution of the irradiation light from the light emitting module 100ga in the state illustrated in FIG. 14B differs from the light distribution of the irradiation light from the light emitting module 100ga in the state illustrated in FIG. 14A.

The light emitting module 100ga can achieve desired light distribution by controlling the shapes and the angles of a plurality of concentric grooves of the Fresnel lens surface 161ga. Further, by providing the Fresnel lens surface, the light emitting surface 11 of the light source 1ga is less likely to be visually recognized from the outside of the light emitting module 100ga. Therefore, the appearance of the light emitting module 100ga can be improved.

(Second Modification of Light Source 1g)

Figure 15A:
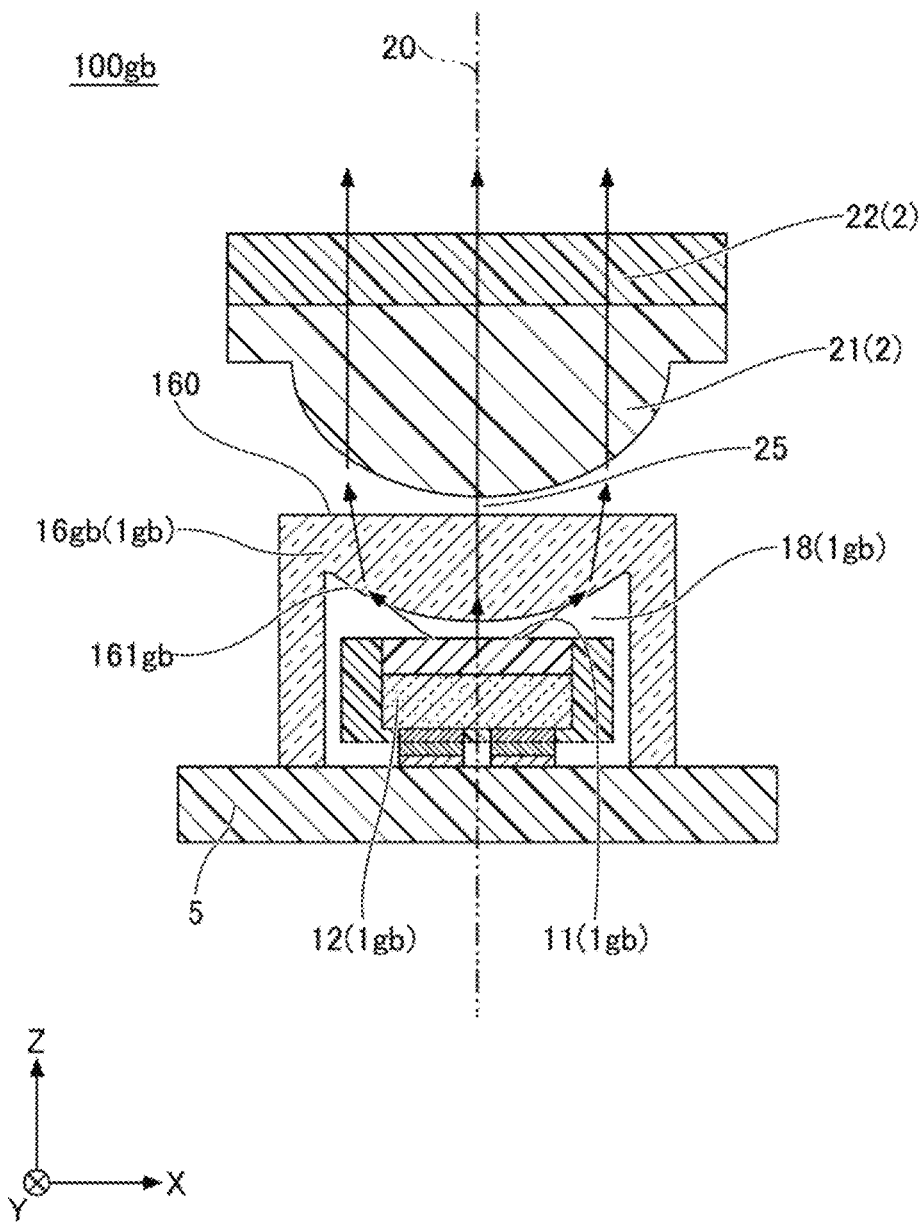
FIG. 15A is a first diagram schematically illustrating a light source according to a second modification of the second embodiment.
Figure 15B:
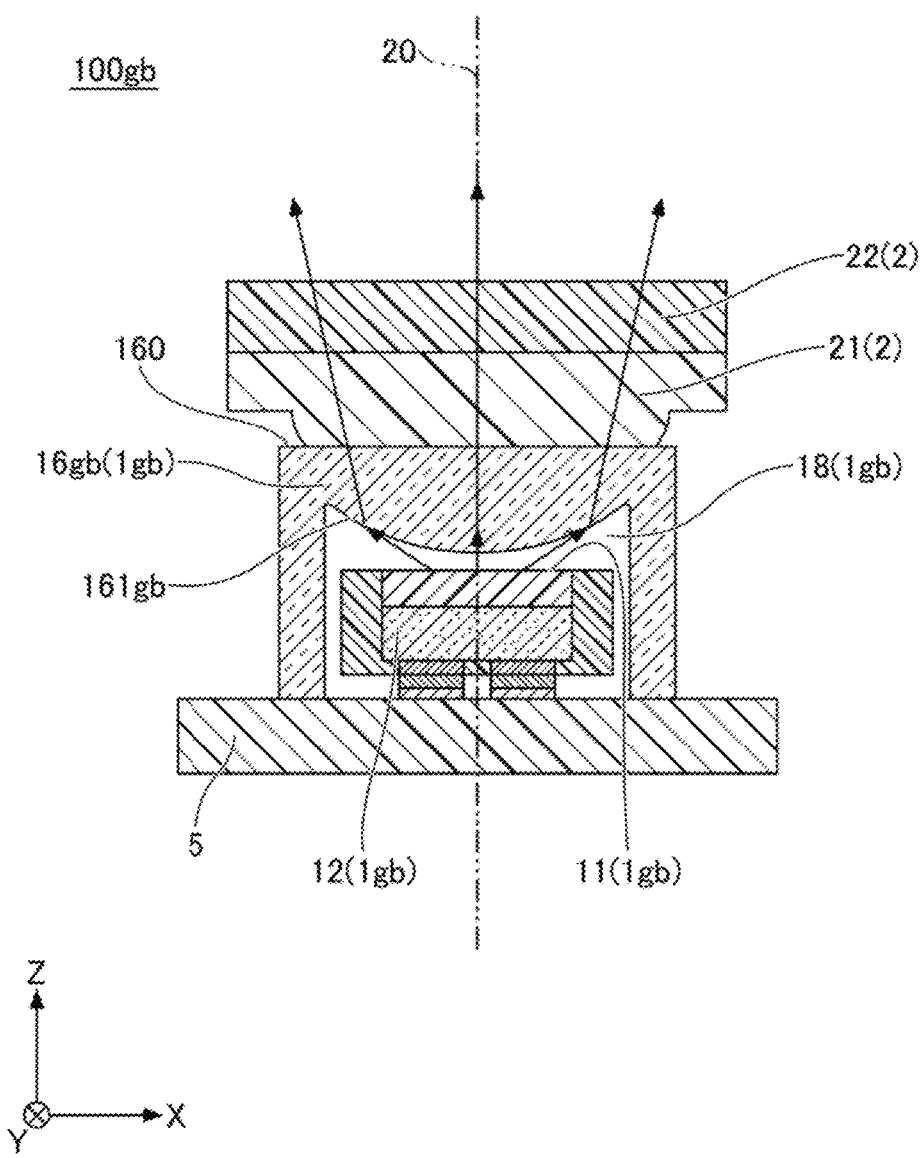
FIG. 15B is a second diagram schematically illustrating the light source according to the second modification of the second embodiment.

FIG. 15A and FIG. 15B are diagrams schematically illustrating a light source 1gb according to a second modification of the light source 1g. A light emitting module 100gb includes the light source 1gb. The configuration of the light emitting module 100gb other than the light source 1gb may be the same as the configuration of the light emitting module 100. FIG. 15A is a cross-sectional view of the light emitting module 100gb before the state of the first lens 2 is changed. FIG. 15B is a cross-sectional view of the light emitting module 100gb after the state of the first lens 2 is changed. As illustrated in FIG. 15A and FIG. 15B, the light source 1gb includes an optical member 16gb.

The optical member 16gb is disposed on the upper surface of the mounting substrate 5 such that the light emitting element 12, the light transmissive member 14, and the covering member 15 are housed within the optical member 16gb. In the optical member 16gb, a convex surface 161gb that protrudes toward the light emitting surface 11 faces the light emitting surface 11 with the second air layer 18 being interposed therebetween. The convex surface 161gb is disposed on the opposite side of the optical member 16gb from the contact portion 160.

In a state illustrated in FIG. 15A, light from the light emitting surface 11 is refracted by the convex surface 161gb, is transmitted through the inside of the optical member 16gb, and then enters the first lens 2 through the contact portion 160 and the first air layer 25. The light that has entered the first lens 2 is transmitted through the inside of the first lens 2, and is emitted toward an irradiation region located on the +Z side of the first lens 2.

Conversely, FIG. 15B illustrates a state in which the first lens 2 in the state illustrated in FIG. 15A is moved by the actuator 3 of FIG. 2 in the −Z direction along the optical axis 20, and the first portion 21 contacts the contact portion 160. Upon the first portion 21 of the first lens 2 contacting the contact portion 160, an external force acting in the +Z direction is applied from the contact portion 160 to the first portion 21. In response to the external force, the first portion 21 is elastically deformed so as to contract in the Z direction.

In the state illustrated in FIG. 15B, light from the light emitting surface 11 is refracted by the convex surface 161gb, is transmitted through the inside of the optical member 16gb, and then enters the first lens 2 through the contact portion 160. The light that has entered the first lens 2 is transmitted through the inside of the first lens 2, and is emitted toward the irradiation region located on the +Z side of the first lens 2. The light distribution of the irradiation light from the light emitting module 100gb in the state illustrated in FIG. 15B differs from the light distribution of the irradiation light from the light emitting module 100gb in the state illustrated in FIG. 15A.

The light emitting module 100gb can achieve desired light distribution by controlling the shape of the convex surface 161gb. In addition, the light extraction efficiency of the light emitting module 100gb can be improved. Further, the light condensing performance of the light emitting module 100gb can be improved.

(Third Modification of Light Source 1g)

Figure 16A:
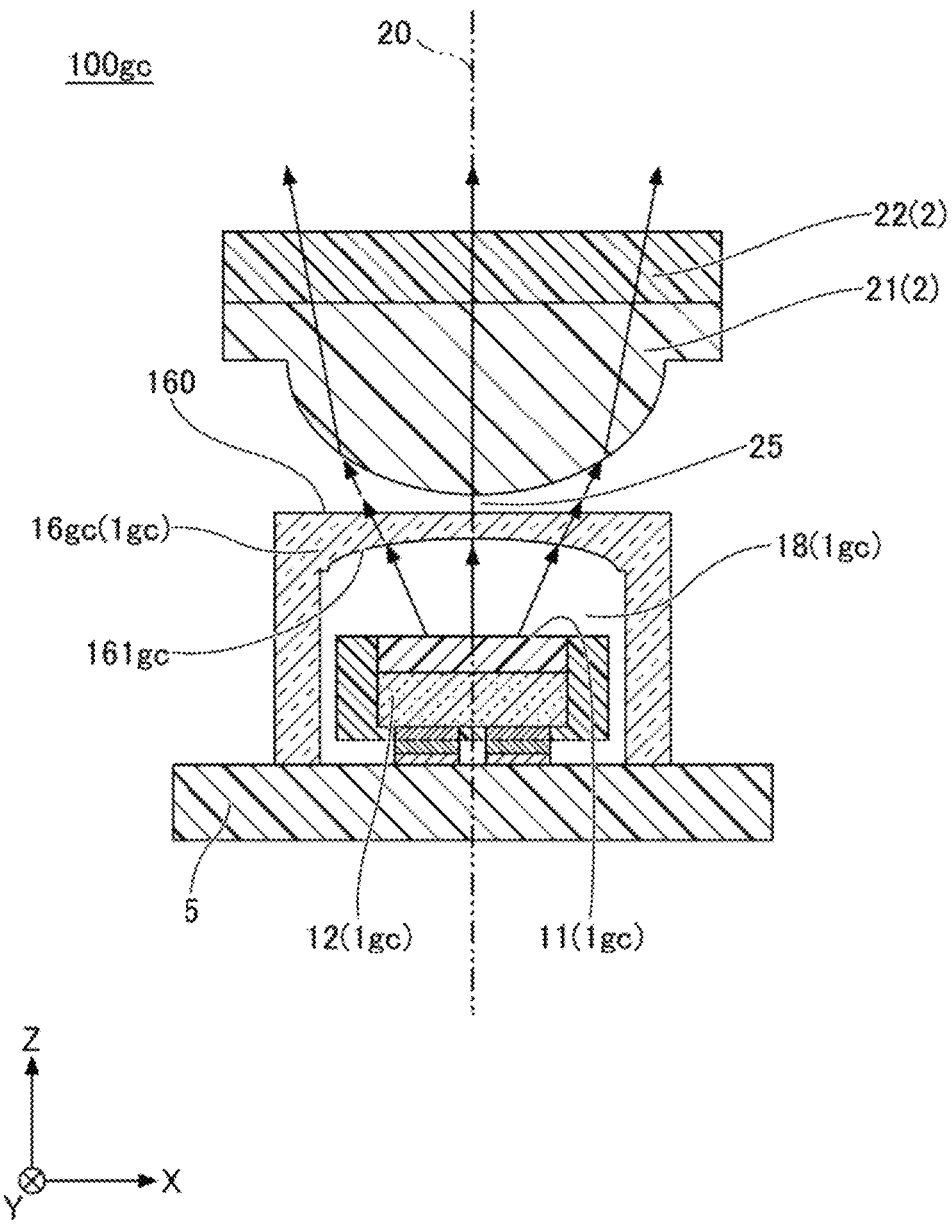
FIG. 16A is a first diagram schematically illustrating a light source according to a third modification of the second embodiment.
Figure 16B:
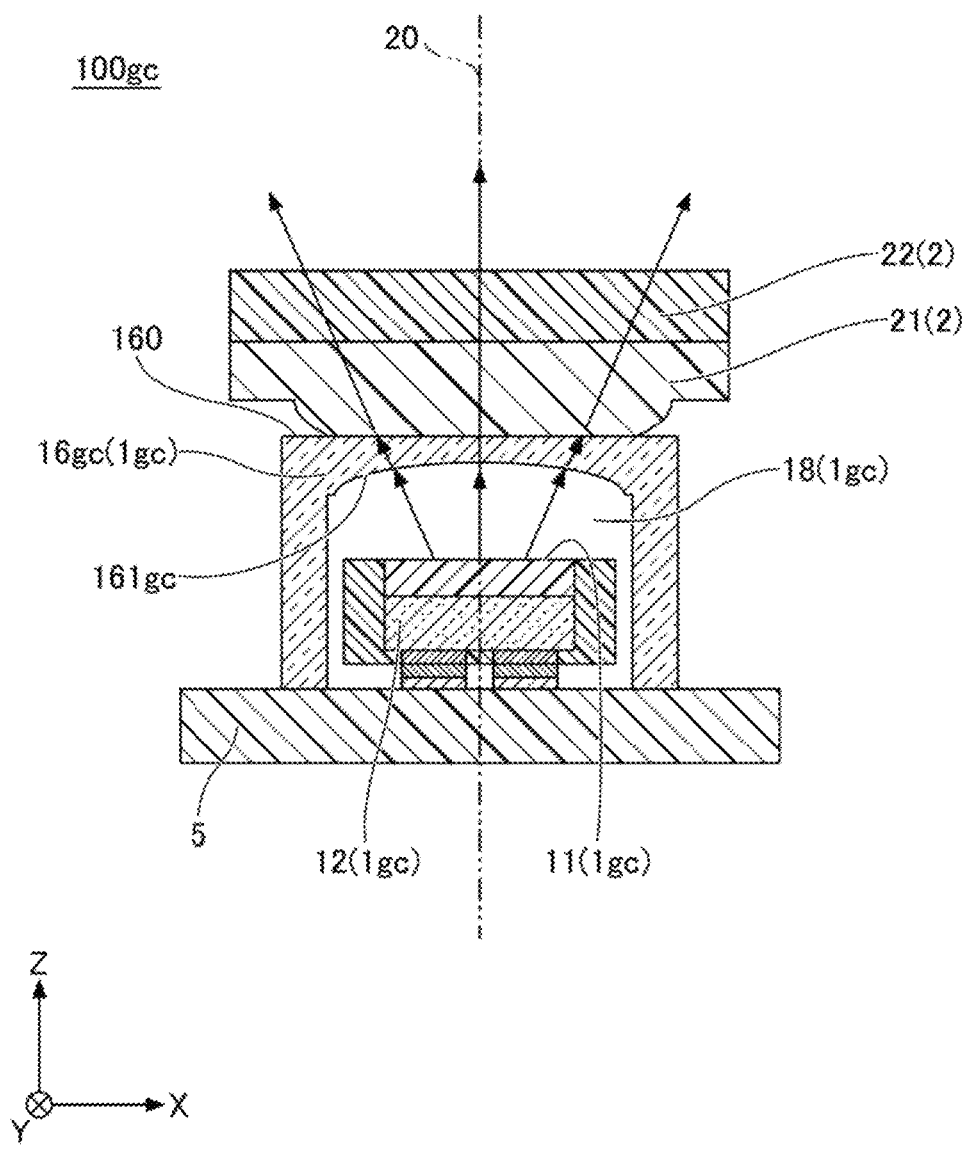
FIG. 16B is a second diagram schematically illustrating the light source according to the third modification of the second embodiment.

FIG. 16A and FIG. 16B are diagrams schematically illustrating a light source 1gc according to a third modification of the light source 1g. A light emitting module 100gc includes the light source 1gc. The configuration of the light emitting module 100gc other than the light source 1gc may be the same as the configuration of the light emitting module 100. FIG. 16A is a cross-sectional view of the light emitting module 100gc before the state of the first lens 2 is changed. FIG. 16B is a cross-sectional view of the light emitting module 100gc after the state of the first lens 2 is changed. As illustrated in FIG. 16A and FIG. 16B, the light source 1gc includes an optical member 16gc.

The optical member 16gc is disposed on the upper surface of the mounting substrate 5 such that the light emitting element 12, the light transmissive member 14, and the covering member 15 are housed within the optical member 16gc. In the optical member 16gc, a concave surface 161gc that is recessed in a direction away from the light emitting surface 11 faces the light emitting surface 11 with the second air layer 18 being interposed therebetween. The concave surface 161gc is disposed on the opposite side of the optical member 16gc from the contact portion 160.

In a state illustrated in FIG. 16A, light from the light emitting surface 11 is refracted by the concave surface 161gc, is transmitted through the inside of the optical member 16gc, and then enters the first lens 2 through the contact portion 160 and the first air layer 25. The light that has entered the first lens 2 is transmitted through the inside of the first lens 2, and is emitted toward an irradiation region located on the +Z side of the first lens 2.

Conversely, FIG. 16B illustrates a state in which the first lens 2 in the state illustrated in FIG. 16A is moved by the actuator 3 of FIG. 2 in the −Z direction along the optical axis 20, and the first portion 21 contacts the contact portion 160. Upon the first portion 21 of the first lens 2 contacting the contact portion 160, an external force acting in the +Z direction is applied from the contact portion 160 to the first portion 21. In response to the external force, the first portion 21 is elastically deformed so as to contract in the Z direction.

In the state illustrated in FIG. 16B, light from the light emitting surface 11 is refracted by the concave surface 161gc, is transmitted through the inside of the optical member 16gc, and then enters the first lens 2 through the contact portion 160. The light that has entered the first lens 2 is transmitted through the inside of the first lens 2, and is emitted toward the irradiation region located on the +Z side of the first lens 2. The light distribution of the irradiation light from the light emitting module 100gc in the state illustrated in FIG. 16B differs from the light distribution of the irradiation light from the light emitting module 100gc in the state illustrated in FIG. 16A.

The light emitting module 100gc can achieve desired light distribution by controlling the shape of the concave surface 161gc. In practice, the irradiation light is refracted at the interface between the first portion 21 and the second portion 22 and at the interface between the second portion 22 and air, but for the sake of simplicity, refraction of the irradiation light at these interfaces is not depicted in FIG. 14A through FIG. 16B.

Third Embodiment

Figure 17A:
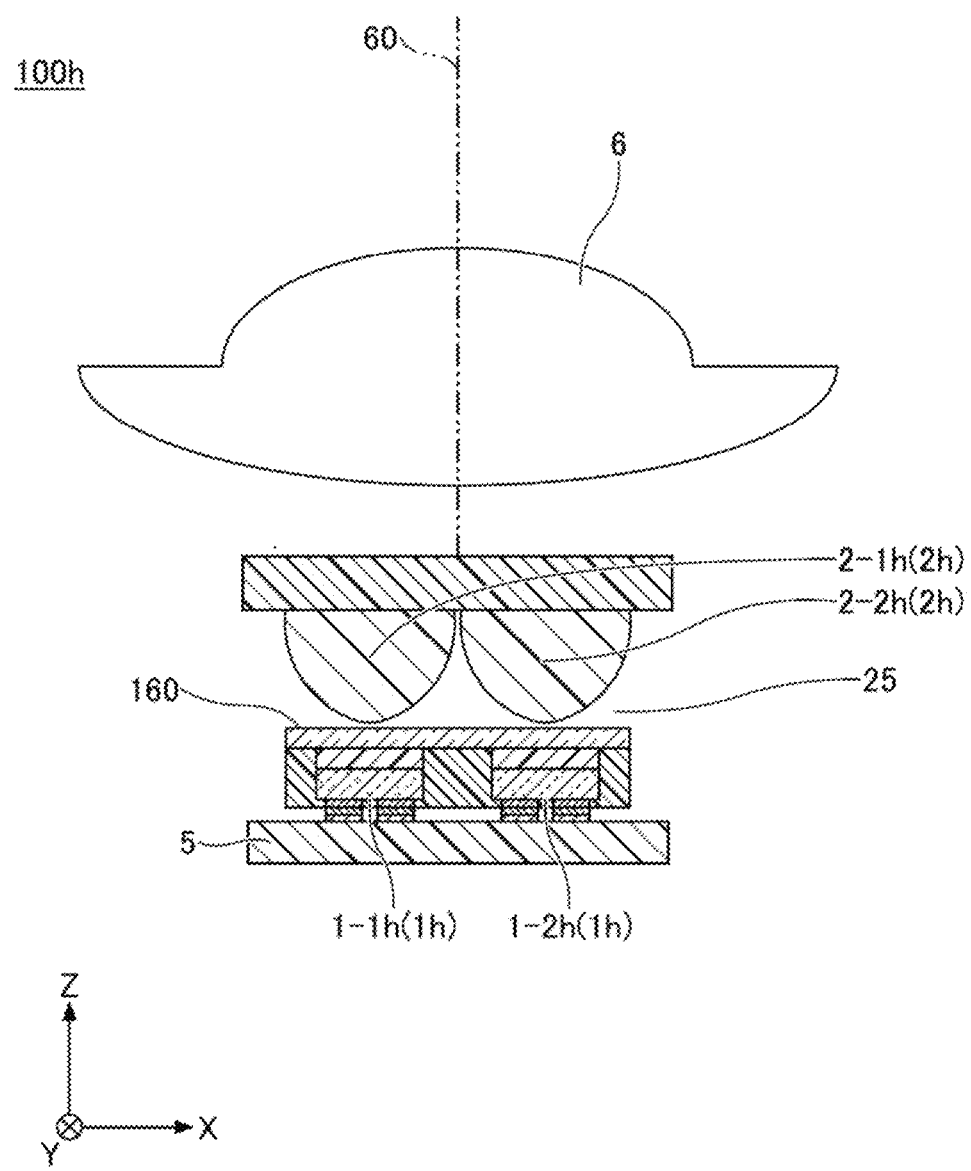
FIG. 17A is a first diagram schematically illustrating an example of a light emitting module according to a third embodiment.
Figure 17B:
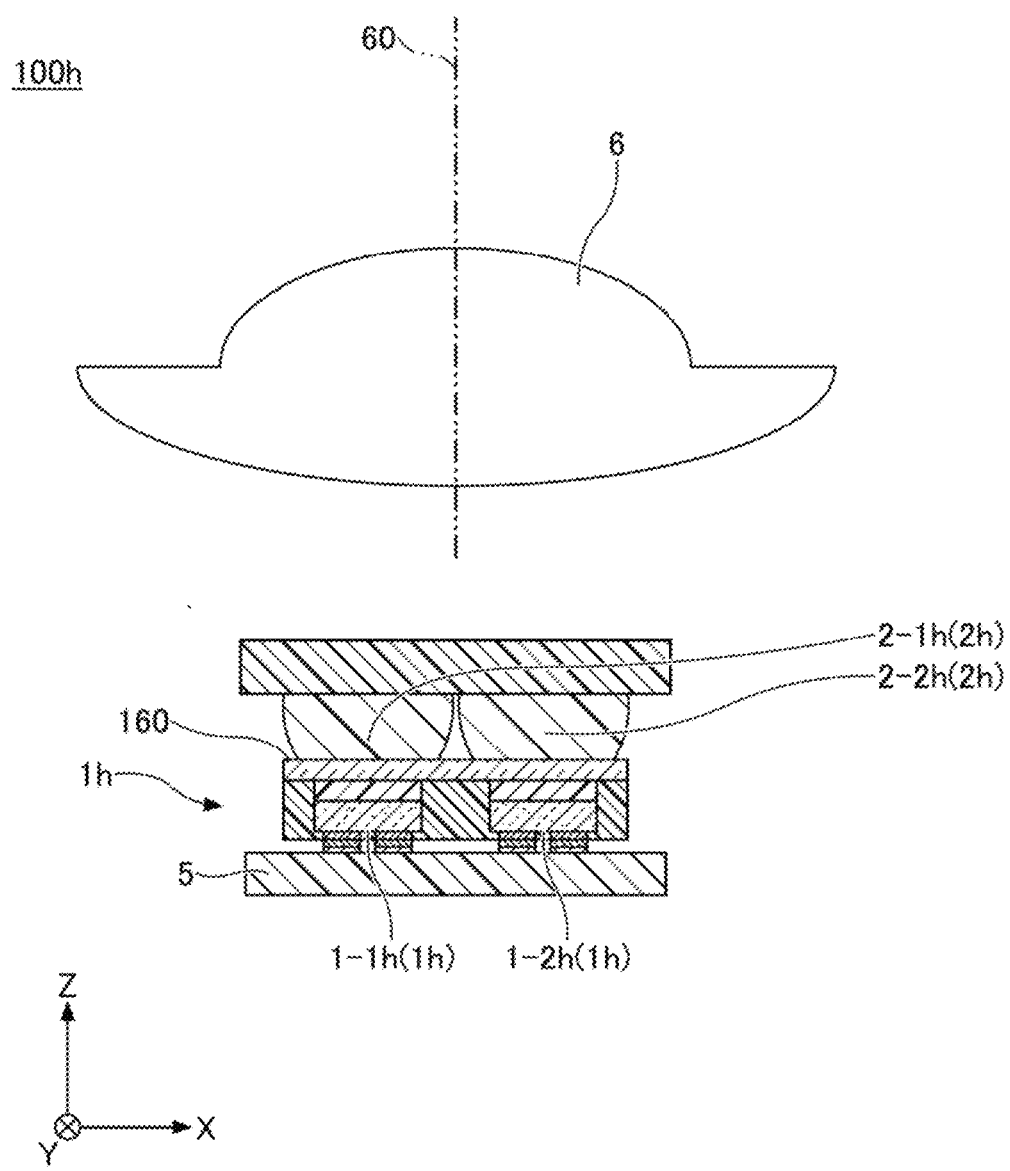
FIG. 17B is a second diagram schematically illustrating the example of the light emitting module according to the third embodiment.

FIG. 17A and FIG. 17B are diagrams schematically illustrating an example of a light emitting module 100h according to a third embodiment. The light emitting module 100h includes a light source 1h, a first lens 2h, and a second lens 6. The configuration of the light emitting module 100h other than the light source 1h, the first lens 2h, and the second lens 6 may be the same as the configuration of the light emitting module 100. FIG. 17A is a cross-sectional view of the light emitting module 100h before the state of the first lens 2h is changed. FIG. 17B is a cross-sectional view of the light emitting module 100h after the state of the first lens 2h is changed.

The light source 1h includes, as a plurality of light emitting parts, a light source 1-1h and a light source 1-2h. The light source 1-1h and the light source 1-2h are aligned in the X direction. In addition, the light source 1h further includes two more light sources. That is, the light source 1h include a total of four light sources aligned in the X direction and the Y direction. The four light sources of the light source 1h correspond to a plurality of light sources aligned in the X direction and the Y direction. The light source 1h may include a plurality of light sources aligned in either the X direction or the Y direction. The configuration of each of the four light sources of the light source 1h may be the same as the configuration of the above-described light source 1. The functions of the light source 1h may be the same as the functions of the above-described light source 1f, except for the number of light sources.

The first lens 2h includes a first lens 2-1h and a first lens 2-2h. The first lens 2-1h and the first lens 2-2h are aligned in the X direction in one-to-one correspondence with the light source 1-1h and the light source 1-2h. In addition, the first lens 2h further includes two more first lenses. That is, the first lens 2h includes a total of four first lenses aligned in the X direction and the Y direction. The four first lenses of the first lens 2h correspond to a plurality of light sources aligned in the X direction and the Y direction in one-to-one correspondence with the plurality of light sources. The first lens 2h may include a plurality of first lenses aligned in either the X direction or the Y direction in accordance with the light source 1h. The configuration of each of the four first lenses of the first lens 2h may be the same as the configuration of the above-described first lens 2. The functions of the first lens 2h may be the same as the functions of the above-described first lens 2f, except for the number of first lenses.

The four first lenses of the first lens 2h are integrally formed. In other words, the four first lenses are connected. The four first lenses are configured to include a resin material, and can be integrally formed by a molding process or the like.

The second lens 6 is disposed on the +Z side of the first lens 2h. The second lens 6 transmits light from the first lens 2h. An optical axis 60 is the optical axis of the second lens 6. The light transmitted through the second lens 6 is emitted toward an irradiation region located on the +Z side of the second lens 6. The second lens 6 is configured to include a resin material, a glass material, or the like. The second lens 6 may be a biconvex lens, a plano-convex lens, a meniscus lens, a biconcave lens, a plano-concave lens, or the like.

Figure 18A:
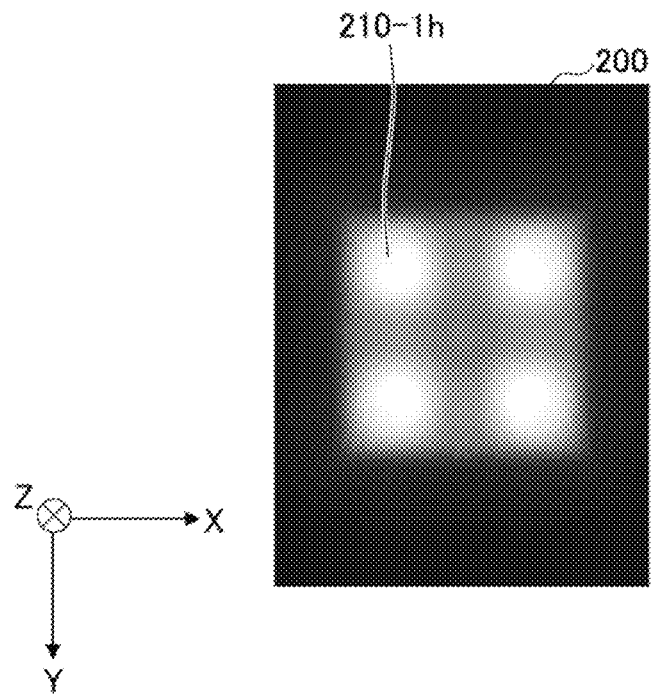
FIG. 18A is a schematic diagram illustrating an example of irradiation light in a state illustrated in FIG. 17A.
Figure 18B:
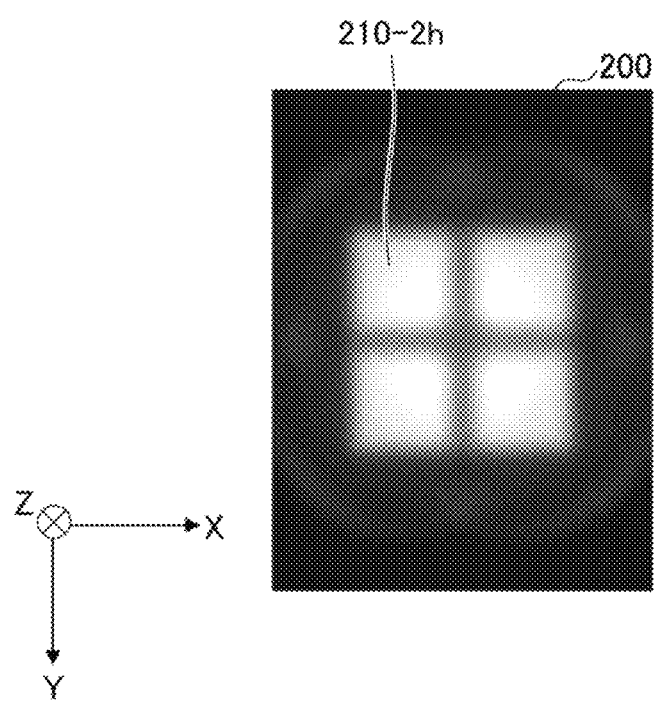
FIG. 18B is a schematic diagram illustrating an example of irradiation light in a state illustrated in FIG. 17B.

FIG. 18A is a diagram illustrating an example of irradiation light in the state illustrated in FIG. 17A. FIG. 18B is a diagram illustrating an example of irradiation light in the state illustrated in FIG. 17B. Each of FIG. 18A and FIG. 18B illustrates simulation results of the illuminance distribution of irradiation light emitted toward an irradiation surface that is located 500 mm away from the light source 1h in the direction along the optical axis 60. As illustrated in FIG. 18A, irradiation light 210-1h is obtained in an irradiation region 200 in the state illustrated in FIG. 17A, that is, in the state in which the first lens 2h does not contact the light source 1h. As illustrated in FIG. 18B, irradiation light 210-2h is obtained in the irradiation region 200 in the state illustrated in FIG. 17B, that is, in the state in which the first lens 2h contacts the light source 1h. As illustrated in FIG. 18B, the light emitting module 100h can change the light distribution of irradiation light such that, in the irradiation region 200, the region of the irradiation light 210-2h emitted from each of the light emitting parts becomes wider than the region of the irradiation light 210-1h.

The light distribution of the irradiation light 210-2h differs from the light distribution of the irradiation light 210-1h. The light emitting module 100h can light distribution by controlling the shape, the position, and the like of the second lens 6. Further, the light emitting module 100h can perform partial irradiation by individually controlling light emission (in other words, turning on) and non-light emission (in other words, turning off) of the light source 1-1h and the light source 1-2h. The "partial irradiation" means that light is emitted only from a light source that is turned on, among the light source 1-1h and the light source 1-2h. Further, the brightness of each of the light sources may be adjusted by changing the current value flowing through each of the light sources. Further, in the state illustrated in FIG. 17A, the number of regions of the irradiation region 200 divided by partial irradiation can be varied by varying the position of the second lens 6 in the X direction and the Y direction, that is, in directions intersecting the optical axis 60.

Fourth Embodiment

Figure 19A:
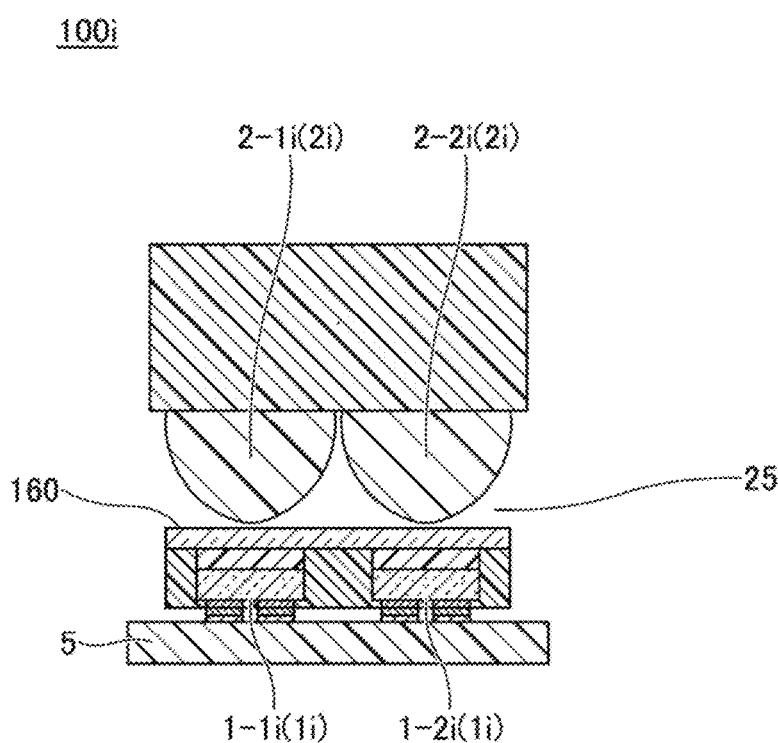
FIG. 19A is a first diagram illustrating an example of a light emitting module according to a fourth embodiment.
Figure 19B:
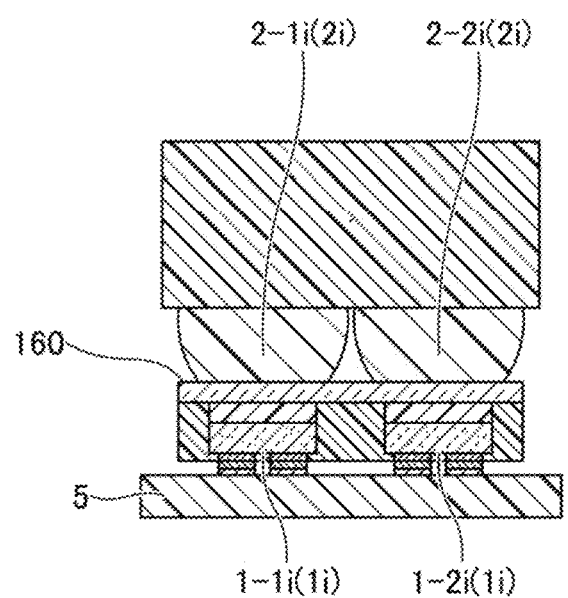
FIG. 19B is a second diagram illustrating the example of the light emitting module according to the fourth embodiment.
Figure 19B:
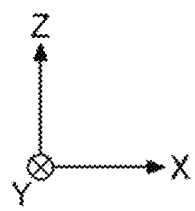

FIG. 19A and FIG. 19B are diagrams schematically illustrating an example of a light emitting module 100i according to a fourth embodiment. The light emitting module 100i includes a light source 1i and a first lens 2i. The configuration of the light emitting module 100i other than the light source 1i and the first lens 2i may be the same as the configuration of the light emitting module 100. FIG. 19A is a cross-sectional view of the light emitting module 100i before the state of the first lens 2i is changed. FIG. 19B is a cross-sectional view of the light emitting module 100i after the state of the first lens 2i is changed.

The light source 1$i$ includes, as a plurality of light emitting parts, a light source 1-1$i$ and a light source 1-2$i$. The light source 1-1$i$ and the light source 1-2$i$ are aligned in the X direction. The light source 1$i$ may include a plurality of light sources aligned in the Y direction. The light source 1$i$ may include a plurality of light sources aligned in the X direction and the Y direction. The light source 1-1$i$ emits light having first chromaticity. The light source 1-2$i$ emits light having second chromaticity that is different from the first chromaticity.

The first lens 2$i$ includes a first lens 2-1$i$ and a first lens 2-2$i$. The first lens 2-1$i$ and the first lens 2-2$i$ are disposed in one-to-one correspondence with the light source 1-1$i$ and the light source 1-2$i$. The first lens 2$i$ may include a plurality of first lenses aligned in the Y direction in accordance with the light source 1$i$. The first lens 2$i$ may include a plurality of first lenses aligned in the X direction and the Y direction in accordance with the light source 1$i$. The configuration of each of the first lens 2-1$i$ and the first lens 2-2$i$ may be the same as the configuration of the above-described first lens 2. The functions of the first lens 2$i$ may be the same as the functions of the above-described first lens 2$f$, except for the number of first lenses.

The light emitting module 100$i$ includes the plurality of light emitting parts configured to emit light having different chromaticity. The light emitting module 100$i$ mixes light having different chromaticity so as to adjust the color of the mixed light. In the light source 1$i$, at least one light emitting part may have the same chromaticity. In addition, in the light source 1$i$, the number of light emitting parts having given chromaticity and the number of light emitting parts having chromaticity different from the given chromaticity may be the same or may be different. For example, if the light emitting module 100$i$ is used for a camera flash, the light source 1$i$ preferably includes, as light emitting parts having different chromaticity, white light emitting parts and amber light emitting parts. In this case, the number of the white light emitting parts is preferably larger than the number of the amber light emitting parts. Accordingly, the light emitting module 100$i$ can emit light in a color range suitable for the camera flash.

Although the embodiments have been described in detail above, the present disclosure is not limited to the above-described embodiments, and various modifications and substitutions can be made to the above-described embodiments without departing from the scope described in the claims.

The numbers such as ordinal numbers and quantities used in the description of the embodiments are all exemplified to specifically describe the technique of the present disclosure, and the present disclosure is not limited to the exemplified numbers. In addition, the connection relationship between the components is illustrated for specifically describing the technique of the present disclosure, and the connection relationship for implementing the functions of the present disclosure is not limited thereto.

The light emitting modules according to the present disclosure can be suitably used for lighting, camera flashes, vehicle headlights, and the like. Examples of a camera include a camera configured to capture still images and a video camera configured to capture moving images. However, the application of the light emitting modules according to the present disclosure is not limited to these applications.

In addition to the above-described embodiments and the modifications, a plurality of first lenses arranged in a matrix may be disposed to face one light source. The thicknesses of the first lenses can be reduced. Thus, the overall thickness of the light emitting module can be reduced, and the size of the light emitting module can be reduced. Further, one first lens may be disposed to face a light source including a plurality of light emitting parts. The shape of the first lens can be simplified, and thus, mass production can be improved. Further, the first lens may be a plano-convex lens, a plano-concave lens, a biconvex lens, a biconcave lens, or the like. The number of optical interfaces can be increased, and thus, optical controllability can be improved.

According to an embodiment of the present disclosure, a light emitting module having a reduced thickness can be provided.

What is claimed is:

1. A light emitting module comprising:
   a light source;
   a first lens configured to transmit light from the light source; and
   an actuator configured to move the first lens in a direction along an optical axis of the first lens, wherein
   the light source includes a contact portion with which the first lens comes into contact,
   the first lens includes a first portion and a reflective portion,
   the first portion is elastically deformable by contacting the contact portion, and the reflective portion is provided around the first portion in a top view, and
   the actuator is configured to move the first lens to change a state of the first lens relative to the contact portion of the light source.

2. The light emitting module according to claim 1, wherein the state of the first lens relative to the contact portion of the light source includes a first state in which a first air layer is present between the contact portion and the first lens, and a second state in which a height of the first air layer between the contact portion and the first lens is reduced as compared to the first state.

3. The light emitting module according to claim 1, wherein
   the first lens further includes a second portion, and
   the second portion has a higher hardness than a hardness of the first portion.

4. The light emitting module according to claim 3, wherein the contact portion of the light source has a higher hardness than the hardness of the first portion of the first lens.

5. The light emitting module according to claim 1, wherein
   the light source includes
   a light emitting surface, and
   an optical member defining the contact portion and disposed between the light emitting surface and the first lens, the optical member being configured to transmit light from the light emitting surface.

6. The light emitting module according to claim 5, wherein the light source has a second air layer between the light emitting surface and the optical member in the direction along the optical axis of the first lens.

7. The light emitting module according to claim 5, wherein the optical member has, at a position opposite the contact portion, one of a Fresnel lens surface, a convex surface that protrudes toward the light emitting surface, and a concave surface that is recessed in a direction away from the light emitting surface.

8. The light emitting module according to claim 1, wherein
   the light source includes a plurality of light sources aligned in either a first direction or a second direction or both in the first direction and the second direction, the second direction being orthogonal to the first direction, and the first lens includes a plurality of first lenses disposed in one-to-one correspondence with the plurality of light sources, and the plurality of first lenses are integrated with one another.

9. The light emitting module according to claim 1, further comprising
a second lens disposed above the first lens and configured to transmit light from the first lens.

10. The light emitting module according to claim 1, wherein the light source includes a light emitting element, the light emitting element being a light emitting diode or a laser diode.

11. The light emitting module according to claim 1, wherein the light source includes a plurality of light emitting parts configured to emit light having different chromaticity.

* * * * *